(12) United States Patent
Huebner

(10) Patent No.: US 7,076,378 B1
(45) Date of Patent: Jul. 11, 2006

(54) DEVICE AND METHOD FOR PROVIDING POWER LINE CHARACTERISTICS AND DIAGNOSTICS

(75) Inventor: Ronald E. Huebner, Waterford, VA (US)

(73) Assignee: Current Technologies, LLC, Germantown, MD (US)

(*) Notice: Subject to any disclaimer, the term of this patent is extended or adjusted under 35 U.S.C. 154(b) by 578 days.

(21) Appl. No.: 10/293,799

(22) Filed: Nov. 13, 2002

(51) Int. Cl.
*G01R 13/00* (2006.01)

(52) U.S. Cl. ............ 702/69; 702/66; 333/236

(58) Field of Classification Search ..............
340/310.91–310.08, 870.07, 310.01; 333/236;
379/142.15–14, 142.16; 702/57, 69
See application file for complete search history.

(56) References Cited

U.S. PATENT DOCUMENTS

| | | | |
|---|---|---|---|
| 2,298,435 A | 10/1942 | Tunick | 250/15 |
| 3,445,814 A | 5/1969 | Spalti | 340/151 |
| 3,605,009 A | 9/1971 | Enge | 323/93 |
| 3,641,536 A | 2/1972 | Prosprich | 340/870.15 |
| 3,656,112 A | 4/1972 | Paull | 340/151 |
| 3,702,460 A | 11/1972 | Blose | 340/150 |
| 3,810,096 A | 5/1974 | Kabat et al. | 340/147 R |
| 3,895,370 A | 7/1975 | Valentini | 340/310 |
| 3,911,415 A | 10/1975 | Whyte | 340/310 |
| 3,942,168 A | 3/1976 | Whyte | 340/310.01 |
| 3,942,170 A | 3/1976 | Whyte | 340/310 |
| 3,962,547 A | 6/1976 | Pattantyus-Abraham | 179/2.5 R |
| 3,964,048 A | 6/1976 | Lusk et al. | 340/310 R |
| 3,967,264 A | 6/1976 | Whyte et al. | 340/310.08 |
| 3,973,087 A | 8/1976 | Fong | |
| 3,973,240 A | 8/1976 | Fong | 340/151 |
| 4,001,559 A * | 1/1977 | Osborne et al. | 714/714 |
| 4,004,110 A | 1/1977 | Whyte | 179/170 J |
| 4,012,733 A | 3/1977 | Whyte | 340/310 |
| 4,016,429 A | 4/1977 | Vercellotti et al. | 307/149 |
| 4,057,793 A | 11/1977 | Johnson et al. | 340/310 R |
| 4,060,735 A | 11/1977 | Pascucci et al. | 307/3 |
| 4,070,572 A | 1/1978 | Summerhayes | 250/199 |
| 4,119,948 A | 10/1978 | Ward et al. | 340/870.02 |
| 4,142,178 A | 2/1979 | Whyte et al. | 340/310 |
| 4,156,280 A | 5/1979 | Griess | 364/481 |
| 4,158,801 A | 6/1979 | Leskovar | 324/127 |
| 4,188,619 A | 2/1980 | Perkins | 340/310 R |
| 4,239,940 A | 12/1980 | Dorfman | 179/2.51 |
| 4,254,402 A | 3/1981 | Perkins | 340/310 R |
| 4,268,818 A | 5/1981 | Davis et al. | 340/870.38 |
| 4,323,882 A | 4/1982 | Gajjar | 340/310 R |
| 4,357,598 A | 11/1982 | Melvin, Jr. | 340/310 A |

(Continued)

FOREIGN PATENT DOCUMENTS

DE  197 28 270 A1  1/1999

(Continued)

OTHER PUBLICATIONS

U.S. Appl. No. 09/765,910, filed Jan. 19, 2001, Kline.

(Continued)

*Primary Examiner*—Timothy Edwards, Jr.
(74) *Attorney, Agent, or Firm*—Manelli Denison & Selter PLLC; Mel Barnes

(57) ABSTRACT

An apparatus determines a characteristic of a portion of a power line. The apparatus comprises a coupling device in communication with a processor. The coupling device receives a signal from a power line and the processor receives the signal from the coupling device and determines a characteristic of a portion of the power line based on the received signal.

41 Claims, 8 Drawing Sheets

U.S. PATENT DOCUMENTS

| | | | |
|---|---|---|---|
| 4,408,186 A | 10/1983 | Howell | 340/310 A |
| 4,433,284 A | 2/1984 | Perkins | 323/361 |
| 4,442,492 A | 4/1984 | Karlsson et al. | 364/464 |
| 4,457,014 A | 6/1984 | Bloy | 381/98 |
| 4,468,792 A | 8/1984 | Baker et al. | 375/45 |
| 4,473,816 A | 9/1984 | Perkins | 340/310 |
| 4,473,817 A | 9/1984 | Perkins | 340/310 |
| 4,481,501 A | 11/1984 | Perkins | 340/310 |
| 4,484,290 A | 11/1984 | Bagnall et al. | 363/483 |
| 4,495,386 A | 1/1985 | Brown et al. | 455/402 |
| 4,504,705 A | 3/1985 | Pilloud | |
| 4,517,548 A | 5/1985 | Ise | |
| 4,569,045 A | 2/1986 | Schieble et al. | 370/85 |
| 4,636,771 A | 1/1987 | Ochs | |
| 4,642,607 A | 2/1987 | Strom et al. | 340/310 |
| 4,644,321 A | 2/1987 | Kennon | 340/310 A |
| 4,652,855 A | 3/1987 | Weikel | 340/310 |
| 4,668,934 A | 5/1987 | Shuey | |
| 4,675,648 A | 6/1987 | Roth et al. | 340/310.07 |
| 4,683,450 A | 7/1987 | Max et al. | 333/202 |
| 4,686,382 A | 8/1987 | Shuey | 307/149 |
| 4,686,641 A | 8/1987 | Evans | 364/580 |
| 4,697,166 A | 9/1987 | Warnagiris et al. | 340/310 R |
| 4,724,381 A * | 2/1988 | Crimmins | 324/127 |
| 4,745,391 A | 5/1988 | Gajjar | 340/310.02 |
| 4,746,897 A | 5/1988 | Shuey | 340/310 R |
| 4,749,992 A | 6/1988 | Fitzemeyer et al. | 340/870.02 |
| 4,766,414 A | 8/1988 | Shuey | 340/310 A |
| 4,785,195 A | 11/1988 | Rochelle et al. | 307/18 |
| 4,799,005 A | 1/1989 | Fernandes | 324/127 |
| 4,800,363 A | 1/1989 | Braun et al. | 340/310 A |
| 4,818,990 A * | 4/1989 | Fernandes | 340/870.07 |
| 4,829,298 A * | 5/1989 | Fernandes | 340/870.27 |
| 4,835,517 A | 5/1989 | van der Gracht et al. | 340/310 A |
| 4,903,006 A | 2/1990 | Boomgaard | 340/310 A |
| 4,973,940 A | 11/1990 | Sakai et al. | 340/310 R |
| 4,979,183 A | 12/1990 | Cowart | 375/142 |
| 5,006,846 A | 4/1991 | Granville et al. | 340/870.28 |
| 5,066,939 A | 11/1991 | Mansfield, Jr. | 340/310 R |
| 5,148,144 A | 9/1992 | Sutterlin et al. | 340/310 R |
| 5,151,866 A | 9/1992 | Glaser et al. | 364/483 |
| 5,185,591 A | 2/1993 | Shuey | 340/310 A |
| 5,191,467 A | 3/1993 | Kapany et al. | 359/341 |
| 5,210,519 A | 5/1993 | Moore | 340/310 |
| 5,257,006 A | 10/1993 | Graham et al. | 340/310 A |
| 5,301,208 A | 4/1994 | Rhodes | 375/36 |
| 5,319,634 A | 6/1994 | Bartholomew et al. | 370/18 |
| 5,351,272 A | 9/1994 | Abraham | 375/38 |
| 5,359,625 A | 10/1994 | Vander Mey et al. | 375/1 |
| 5,369,356 A | 11/1994 | Kinney et al. | 324/142 |
| 5,375,141 A | 12/1994 | Takahashi | 375/1 |
| 5,406,249 A | 4/1995 | Pettus | 340/310.06 |
| 5,410,720 A | 4/1995 | Osterman | 725/150 |
| 5,426,360 A | 6/1995 | Maraio et al. | 324/126 |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | 371/30 |
| 5,485,040 A | 1/1996 | Sutterlin | 307/3 |
| 5,491,463 A | 2/1996 | Sargeant et al. | 340/310.01 |
| 5,497,142 A | 3/1996 | Chaffanjon | 340/310.06 |
| 5,498,956 A | 3/1996 | Kinney et al. | 324/142 |
| 5,533,054 A | 7/1996 | DeAndrea et al. | 375/286 |
| 5,559,377 A | 9/1996 | Abraham | 307/104 |
| 5,579,221 A | 11/1996 | Mun | 364/188 |
| 5,579,335 A | 11/1996 | Sutterlin et al. | 375/200 |
| 5,592,482 A | 1/1997 | Abraham | 348/8 |
| 5,598,406 A | 1/1997 | Albrecht et al. | 370/296 |
| 5,616,969 A | 4/1997 | Morava | 307/91 |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | 375/147 |
| 5,656,931 A | 8/1997 | Lau et al. | 324/522 |
| 5,664,002 A | 9/1997 | Skinner, Sr. | 379/56.2 |
| 5,684,450 A | 11/1997 | Brown | 340/310.02 |
| 5,691,691 A | 11/1997 | Merwin et al. | 340/310.02 |
| 5,694,108 A | 12/1997 | Shuey | 340/310.01 |
| 5,705,974 A | 1/1998 | Patel et al. | 340/310.08 |
| 5,712,614 A | 1/1998 | Patel et al. | 340/310.03 |
| 5,717,685 A | 2/1998 | Abraham | 370/30 |
| 5,726,980 A | 3/1998 | Rickard | 370/293 |
| 5,748,671 A | 5/1998 | Sutterlin et al. | 375/206 |
| 5,770,996 A | 6/1998 | Severson et al. | 340/310.08 |
| 5,774,526 A | 6/1998 | Propp et al. | 379/90.1 |
| 5,777,544 A | 7/1998 | Vander Mey et al. | 340/310.06 |
| 5,777,545 A | 7/1998 | Patel et al. | 341/310.06 |
| 5,777,769 A | 7/1998 | Coutinho | 359/173 |
| 5,778,116 A | 7/1998 | Tomich | 385/16 |
| 5,796,607 A | 8/1998 | Le Van Suu | 364/140.01 |
| 5,802,102 A | 9/1998 | Davidovici | 375/152 |
| 5,805,053 A | 9/1998 | Patel et al. | 340/310.01 |
| 5,818,127 A | 10/1998 | Abraham | 307/106 |
| 5,828,293 A * | 10/1998 | Rickard | 340/310.04 |
| 5,835,005 A | 11/1998 | Furukawa et al. | 340/310.01 |
| 5,847,447 A | 12/1998 | Rozin et al. | 257/678 |
| 5,856,776 A | 1/1999 | Armstrong et al. | 340/310.01 |
| 5,864,284 A | 1/1999 | Sanderson | 340/310.01 |
| 5,870,016 A | 2/1999 | Shrestha | 340/310.01 |
| 5,880,677 A | 3/1999 | Lestician | 340/825.06 |
| 5,881,098 A | 3/1999 | Tzou | 375/152 |
| 5,892,430 A | 4/1999 | Wiesman et al. | 340/310.01 |
| 5,899,960 A | 5/1999 | Moore et al. | 702/60 |
| 5,929,750 A | 7/1999 | Brown | 340/310.02 |
| 5,933,071 A | 8/1999 | Brown | 340/310.01 |
| 5,933,073 A | 8/1999 | Shuey | 340/310.07 |
| 5,937,003 A | 8/1999 | Sutterlin et al. | 375/208 |
| 5,937,342 A | 8/1999 | Kline | 455/402 |
| 5,949,327 A | 9/1999 | Brown | 340/310.01 |
| 5,963,585 A | 10/1999 | Omura et al. | 375/207 |
| 5,977,650 A | 11/1999 | Rickard et al. | 307/3 |
| 5,978,371 A | 11/1999 | Mason, Jr. et al. | 370/389 |
| 5,982,276 A | 11/1999 | Stewart | 340/310.01 |
| 5,994,998 A | 11/1999 | Fisher et al. | 340/310.01 |
| 6,014,386 A | 1/2000 | Abraham | 370/485 |
| 6,023,106 A | 2/2000 | Abraham | 307/3 |
| 6,037,678 A | 3/2000 | Rickard | 307/89 |
| 6,037,857 A | 3/2000 | Behrens et al. | 340/310.03 |
| 6,040,759 A * | 3/2000 | Sanderson | 340/310.01 |
| 6,072,858 A * | 6/2000 | Bellin | 379/33 |
| 6,091,932 A | 7/2000 | Langlais | 455/5.1 |
| 6,104,707 A | 8/2000 | Abraham | 370/295 |
| 6,140,911 A | 10/2000 | Fisher et al. | 340/310.01 |
| 6,141,634 A | 10/2000 | Flint et al. | 703/18 |
| 6,144,292 A | 11/2000 | Brown | 340/310.02 |
| 6,151,330 A | 11/2000 | Liberman | 370/449 |
| 6,157,292 A | 12/2000 | Piercy et al. | 340/310.01 |
| 6,172,597 B1 | 1/2001 | Brown | 340/310.02 |
| 6,177,849 B1 | 1/2001 | Barsellotti et al. | 333/177 |
| 6,212,658 B1 | 4/2001 | Le Van Suu | 714/749 |
| 6,226,166 B1 | 5/2001 | Gumley et al. | 361/118 |
| 6,239,722 B1 | 5/2001 | Colton et al. | 340/870.02 |
| 6,282,405 B1 | 8/2001 | Brown | 725/79 |
| 6,297,729 B1 | 10/2001 | Abali et al. | 340/310.01 |
| 6,297,730 B1 | 10/2001 | Dickinson | 340/310.01 |
| 6,313,738 B1 | 11/2001 | Wynn | |
| 6,317,031 B1 | 11/2001 | Rickard | 340/310.03 |
| 6,331,814 B1 | 12/2001 | Albano et al. | 340/310.01 |
| 6,373,376 B1 | 4/2002 | Adams et al. | 340/310.01 |
| 6,396,391 B1 | 5/2002 | Binder | 340/310.01 |
| 6,396,392 B1 | 5/2002 | Abraham | 340/310.01 |
| 6,404,773 B1 | 6/2002 | Williams et al. | 370/463 |
| 6,407,987 B1 | 6/2002 | Abraham | 370/295 |
| 6,414,578 B1 | 7/2002 | Jitaru | 336/170 |
| 6,425,852 B1 | 7/2002 | Epstein et al. | 600/13 |

| | | | |
|---|---|---|---|
| 6,441,723 B1 | 8/2002 | Mansfield, Jr. et al. | 340/310.01 |
| 6,452,482 B1 | 9/2002 | Cern | 340/310.01 |
| 6,459,998 B1* | 10/2002 | Hoffman | 702/62 |
| 6,480,510 B1 | 11/2002 | Binder | 370/502 |
| 6,486,747 B1 | 11/2002 | DeCramer et al. | 333/25 |
| 6,496,104 B1 | 12/2002 | Kline | 340/310.01 |
| 6,504,357 B1 | 1/2003 | Hemminger et al. | 340/310.01 |
| 6,522,650 B1 | 2/2003 | Yonge, III et al. | |
| 6,854,059 B1 | 2/2005 | Gardner | |
| 2001/0038329 A1 | 11/2001 | Diamanti et al. | 340/310.01 |
| 2001/0038343 A1 | 11/2001 | Meyer et al. | 340/870.02 |
| 2001/0052843 A1 | 12/2001 | Wiesman et al. | 340/310.01 |
| 2001/0054953 A1 | 12/2001 | Kline | 340/310.01 |
| 2002/0010870 A1 | 1/2002 | Gardner | 713/300 |
| 2002/0014884 A1 | 2/2002 | Chung | 324/74 |
| 2002/0027496 A1 | 3/2002 | Cern | 340/310.01 |
| 2002/0041228 A1 | 4/2002 | Zhang | 340/310.01 |
| 2002/0048368 A1 | 4/2002 | Gardner | |
| 2002/0060624 A1 | 5/2002 | Zhang | 340/310.01 |
| 2002/0071452 A1 | 6/2002 | Abraham | 370/480 |
| 2002/0080010 A1 | 6/2002 | Zhang | 340/310.06 |
| 2002/0095662 A1 | 7/2002 | Ashlock et al. | 717/136 |
| 2002/0097953 A1 | 7/2002 | Kline | |
| 2002/0098867 A1 | 7/2002 | Meiksen et al. | 455/560 |
| 2002/0098868 A1 | 7/2002 | Meiksen et al. | |
| 2002/0105413 A1 | 8/2002 | Cern et al. | 340/310.01 |
| 2002/0110310 A1 | 8/2002 | Kline | |
| 2002/0110311 A1 | 8/2002 | Kline | |
| 2002/0121963 A1 | 9/2002 | Kline | |
| 2002/0140547 A1 | 10/2002 | Litwin, Jr. et al. | 340/310.01 |
| 2002/0154000 A1 | 10/2002 | Kline | |
| 2002/0161542 A1* | 10/2002 | Jones et al. | 702/108 |
| 2002/0171535 A1 | 11/2002 | Cem | 340/310.07 |
| 2003/0021388 A1* | 1/2003 | Starr et al. | 379/1.04 |
| 2003/0021391 A1* | 1/2003 | Rubin et al. | 379/22.04 |
| 2003/0062990 A1 | 4/2003 | Schaeffer, Jr. et al. | 340/310.01 |
| 2003/0067910 A1 | 4/2003 | Razazian et al. | 370/352 |
| 2003/0169155 A1 | 9/2003 | Mollenkopf et al. | |
| 2003/0185237 A1 | 10/2003 | Baker, Jr. | |
| 2003/0224784 A1 | 12/2003 | Hunt et al. | |
| 2003/0227373 A1 | 12/2003 | Lou et al. | |
| 2004/0001438 A1 | 1/2004 | Aretz | |
| 2004/0001499 A1 | 1/2004 | Patella et al. | |
| 2004/0037317 A1 | 2/2004 | Zakitzky et al. | |
| 2004/0070912 A1 | 4/2004 | Kopp | |
| 2004/0110483 A1 | 6/2004 | Mollenkopf | |
| 2004/0113756 A1 | 6/2004 | Mollenkopf | |
| 2004/0113757 A1 | 6/2004 | White, II et al. | |
| 2004/0174851 A1 | 9/2004 | Zalitzky et al. | |
| 2004/0223617 A1 | 11/2004 | Corcoran et al. | |
| 2004/0227621 A1 | 11/2004 | Cope et al. | |
| 2004/0227622 A1 | 11/2004 | Giannini et al. | |
| 2004/0242185 A1 | 12/2004 | Lee | |
| 2004/0266322 A1 | 12/2004 | Lang | |
| 2005/0063422 A1 | 3/2005 | Lazar et al. | |
| 2005/0076149 A1 | 4/2005 | McKown et al. | |
| 2005/0128057 A1 | 6/2005 | Mansfield et al. | |

FOREIGN PATENT DOCUMENTS

| | | |
|---|---|---|
| DE | 100 08 602 A1 | 6/2001 |
| DE | 100 12 235 C2 | 12/2001 |
| DE | 100 59 564 A1 | 9/2002 |
| DE | 100 48 348 C2 | 11/2002 |
| DE | 101 190 039 A1 | 12/2002 |
| DE | 101 190 040 A1 | 12/2002 |
| DE | 101 47 916 C1 | 5/2003 |
| DE | 101 46 982 C1 | 6/2003 |
| DE | 101 47 915 C1 | 6/2003 |
| EP | 0 581 351 A1 | 2/1994 |
| EP | 0 470 185 B1 | 11/1995 |
| EP | 0 913 955 A2 | 5/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 0 916 194 B1 | 9/2001 |
| EP | 1 011 235 A3 | 5/2002 |
| EP | 1 014 640 A3 | 7/2002 |
| EP | 1 021 866 B1 | 10/2002 |
| ES | 2 122 920 A1 | 12/1998 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| WO | 95/29536 A1 | 11/1995 |
| WO | 98/019095 A1 | 1/1998 |
| WO | 98/33258 A2 | 7/1998 |
| WO | 98/33258 A3 | 7/1998 |
| WO | 98/40980 A1 | 9/1998 |
| WO | 00/59076 A1 | 10/2000 |
| WO | 00/60701 A1 | 10/2000 |
| WO | 01/08321 A1 | 2/2001 |
| WO | 01/43305 A1 | 6/2001 |
| WO | 01/63787 A1 | 8/2001 |
| WO | 01/77698 A2 | 10/2001 |
| WO | 01/82497 A1 | 11/2001 |
| WO | 02/37712 A1 | 5/2002 |
| WO | 02/054605 A1 | 7/2002 |
| WO | WO-03/009083 A2 | 1/2003 |
| WO | WO-03/009083 A3 | 1/2003 |
| WO | WO-03/010896 A1 | 2/2003 |
| WO | WO-03/040732 A2 | 5/2003 |
| WO | WO-03/056715 A1 | 7/2003 |

OTHER PUBLICATIONS

U.S. Appl. No. 09/805,638, filed Mar. 14, 2001, Kline.
U.S. Appl. No. 09/835,532, filed Apr. 16, 2001, Kline.
U.S. Appl. No. 09/837,972, filed Apr. 19, 2001, Kline et al.
U.S. Appl. No. 09/912,633, filed Jul. 25, 2001, Kline.
U.S. Appl. No. 09/915,459, filed Jul. 26, 2001, Kline.
U.S. Appl. No. 09/924,730, filed Aug. 8, 2001, Kline.
U.S. Appl. No. 10/016,998, filed Dec. 14, 2001, Kline.
U.S. Appl. No. 10/036,914, filed Dec. 21, 2001, Mollenkopf et al.
U.S. Appl. No. 10/075,708, filed Feb. 14, 2002, Kline.
U.S. Appl. No. 10/075,332, filed Feb. 14, 2002, Kline.
U.S. Appl. No. 10/150,694, filed May 16, 2002, Gidge.
U.S. Appl. No. 10/165,992, filed Jun. 10, 2002, Kline.
U.S. Appl. No. 10/292,745, filed Nov. 12, 2002, Cope et al.
U.S. Appl. No. 10/292,714, filed Nov. 12, 2002, Cope.
U.S. Appl. No. 10/315,725, filed Dec. 10, 2002, Cope et al.
U.S. Appl. No. 10/319,317, filed Dec. 13, 2002, Mollenkopf et al.
U.S. Appl. No. 10/348,164, filed Jan. 21, 2003, Cope et al.
U.S. Appl. No. 10/385,899, filed Mar. 10, 2003, Mollenkopf.
U.S. Appl. No. 10/434,024, filed May 8, 2003, Corcoran et al.
U.S. Appl. No. 10/436,778, filed May 13, 2003, Giannini et al.
Patent Abstracts of Japan, Japanese Publication No. 10200544 A2, published Jul. 31, 1998, (Matsushita Electric Works, LTD).
Tohoku Electric Power, Co., Inc., "Tokhoku Electric Develops High-Speed Communications System Using Power Distribution Lines,"*Tohoku Currents*, Spring 1998, 8(1), 2 pages (http://www.tohoku-epco.co.ip/profil/kurozu/c_vol8_1/art04/htm).

Power Line Communications Conference entiled, "PLC, A New Competitor in Broadband Internet Access," Dec. 11-12, 2001, Washington, D.C., 60 pages.

Rivkin, S. R., "Co-Evolution of Electric & Telecommunication Networks," *The Electricity Journal*, May 1998, 71-76.

Marketing Assessment Presentation entitled "Powerline Telecommunications," The Shpigler Group for CITI PLT, Jul. 16, 2002, 9 pages.

Campbell, C., presentation entitled "Building a Business Case for PLC: Lessons Learned From the Communication Industry Trenches," KPMG Consulting, Jul. 16, 2002, 5 pages.

"Embedded Power Line Carrier Modem," Archnet Electronic Technology, http://www.archnetco.com/english/product/ATL90.htm, 2001, 3 pages.

"Archnet: Automatic Meter Reading System Power Line Carrier Communication", www.archnetco.com/english/product/product_sl.html 3 pages.

"Power Line Communications Solutions", www.echelon.com/products/oem/transceivers/powerline/default.htm, 2 pages.

Feduschak, N.A., "Waiting in the Wings: Is Powerline Technology Ready to Compete With Cable?", Mar. 2001, www.cabletoday.com/ic2/archives/0301/0301powerline.htm, 5 pages.

"Signalling on Low-Voltage Electrical Installations in the Frequency Band 3kHz to 148.5kz-Part 4: Filters at the Interface of the Indoor and Outdoor Electricitiy Network", *CLC SC 105A (Secretariat)* May 1992, 62, 1-11.

"Intellon Corporation Test Summary for Transformerless Coupler Study", *Intellon No News Wires*, Dec. 24, 1998, DOT/NHTSA Order No. DTNH22-98-P-07632, pp 1-18.

EMETCON *Automated Distribution System*, ABB Power T & D Company, Inc., Jan. 1990, Raleigh, North Carolina, No B-919A, 14 pages.

"Dedicated Passive Backbone for Power Line Communications", *IBM Technical Disclosure Bulletin*, Jul. 1997, 40(7), 183-185.

Coaxial Feeder Cables [Engineering Notes], *PYE Telecommunications Limited Publication Ref No. TSP507/1*, Jun. 1975, Cambridge, England, 15 pages.

"Centralized Commercial Building Applications with the Lonworks ® PLT-21 Power Line Transceiver", *Lonworks Engineering Bulletin*, Echelon, Apr. 1997, pp 1-22.

Plexeon Logistics, Inc., "Power Line Communications", www.plexeon.com/power.html, 2 pages.

"EMETCON Automated Distribution System: Communications Guide", *Westinghouse ABB Power T & D COmpany Technical Manual 42-6001A*, Sep. 1989, 55 pages.

Abraham, K.C. et al., "A Novel High-Speed PLC Communication Modem", *IEEE Trnasactions on Power Delivery*, 1992, 7(4), 1760-1768.

J.M. Barstow., "A Carrier Telephone System for Rural Service", *AIEE Transactions*, 1947, 66, 301-307.

Chang, S.S.L., "Power-Line Carrier", *Fundamentals Handbook of Electrical and Computer Engineering*, vol. II-Communication, Control, Devices and Systems, John Wiley & Sons, 617-627.

Chen, Y-F. et al. "Baseband Transceiver Design of a 128-Kbps Power-Line Modem for Household Applications", *IEEE Transactions on Power Delivery*, 2002, 17(2), 338-344.

Coakley, N.G. et al., "Real-Time Control of a Servosytem Using the Inverter-Fed Power Lines to Communicate Sensor Feedback", *IEEE Transactions on Industrial Electronics*, 1999, 46(2), 360-369.

Esmailian, T. et al., "A Discrete Multitone Power Line Communication System", *Department of Electrical and Computer Engineering*, University of Toronto, Ontario Canada, 2000 IEEE, pp 2953-2956.

Kawamura, A. et al., "Autonomous Decentralized Manufacturing System Using High-speed Network with Inductive Transmission of Data and Power", *IEEE*, 1996, 940-945.

Kilbourne, B. "EEI Electric Perspectives: The Final Connection", www.eei.org/ep/editorial/Jul-01/0701conenct.htm, 7 pages.

Kim, W-O., et al., "A Control Network Architecture Based on EIA-709.1 Protocol for Power Line Data Communications", *IEEE Transactions on Consumer Electronics*, 2002, 48(3), 650-655.

Lim C.K. et al., "Development of a Test Bed for High-Speed Power Line Communications", School of Electrical and Electronic Engineering, Nanyang Technological University, Singapore, *IEEE*, 2000, 451-456.

Lokken, G. et al., "The Proposed Wisconsin electric Power Company Load Management System Using Power Line Carrier Over Distribution Lines", *1976 National Telecommunications Conference, IEEE*, 1976, 2.2-12.2-3.

Marthe, E. et al., "Indoor Radiated Emission Associated with Power Line Communication Systems", *Swiss Federal Institute of Technology Power Systems Laboratory IEEE*, 2001, 517-520.

Naredo, J.L. et al., "Design of Power Line Carrier Systems on Multitransposed Delta Transmission Lines", *IEEE Transactions on Power Delivery*, 1991, 6(3), 952-958.

Nichols, K., "Build a Pair of Line-Carrier Modems", *CRC Electronics-Radio Electronics*, 1988, 87-91.

Okazaki, H, et al., "A Transmitting, and Receiving Method for CDMA Communications Over Indoor Electrical Power Lines", *IEEE*, 1998, pp VI-522-VI-528.

B. Don Russell, "Communication Alternatives for Distribution Metering and Load Management", *IEEE Transactions on Power Apparatus and Systems*, 1980, vol. PAS-99(4), pp 1448-1455.

Sado, WN. et al., "Personal Communication on Residential Power Lines- Assessment of Channel Parameters", *IEEE*, 532-537.

"HomePlug 1.01 Specification", *HomePlug Powerline Alliance*, (Dec. 1, 2001), 1-39.

"HomePlug Initital Draft Medium Interface Specification",*HomePlug Powerline Alliance*, (May 19, 2000), 1-109.

"HomePlug Initital Draft Medium Interface Specification", *HomePlug Powerline Alliance*, (Jul. 27, 2000), 1-109.

"HomePlug Powerline Alliance", *HomePlug 0.5 Draft Medium Interface Specification,,* (Nov. 28, 2000), 1-133.

Gutzwiller, F W., et al., "Homenet: A Control Network for Consumer Applications", *IEEE Transactions on Consumer Electronics*, (Aug. 1983),297-304.

Piety, R A., "Intrabuilding Data Transmission Using Power-Line Wiring", *Hewlett-Packard Journal*, (May 1987),35-40.

Yoshitoshi, M , et al., "Proposed Interface Specifications for Home Bus", *IEEE Transactions on Consumer Electronics*, (Aug. 1986), 550-557.

"Texas Instruments: System Block Diagrams; Power Line Communication (Generic)", http://focus.ti.com/docs/apps/catalog/resources/blockdiagram.jhtml?bdId=638, © 1995-2002 1 page.

* cited by examiner

DEVICE AND METHOD FOR PROVIDING POWER LINE CHARACTERISTICS AND DIAGNOSTICS

FIELD OF THE INVENTION

The invention generally relates to data communication over power lines and more particularly, to characterizing and diagnosing power lines for communication over the power lines.

BACKGROUND OF THE INVENTION

A well-established power distribution system exists throughout most of the United States and other countries. The power distribution system provides power to users via power lines. With some modification, the infrastructure of the existing power distribution system can be used to provide data communication in addition to power delivery. That is, data signals can be carried by the existing power lines that already have been run to many homes and offices. The use of the existing power lines may help reduce the cost of implementing a data communication system. To implement the data communication system, data signals may be communicated to and from the power line at various points in the power distribution system, such as, for example, near homes, offices, electrical substations, and like.

While the concept may sound simple, there are many challenges to overcome in order to use power lines for data communication. One particular problem with using power lines for data communication is related to characterizing power lines. Power lines are not typically used for data communication and therefore, little is known about their characteristics and their ability to carry data signals, specifically with respect to broadband data signals.

Therefore, a need exists for a system and method of characterizing a power line for communication of broadband data signals.

Existing techniques for measuring power line characteristics (e.g., low frequency characteristics) have several disadvantages. For example, installing measuring equipment may require a utility crew and a bucket truck and can therefore be a time consuming process. Further, test equipment typically is very expensive and often not designed to be portable or rugged. Moreover, downloading information from the test equipment to a personal computer adds another step that tacks on more time to an already time consuming process. Such techniques are not practical for deployment of a large data communication network over a power distribution system where each power line installation may be different and therefore, may have its own unique set of characteristics. Moreover, because the power lines are energized at a high voltage, any testing system and method should provide protection against the voltage of the power lines. Additionally, if a particular portion of a power line communication system experiences a decrease in performance, a person troubleshooting the problem may have very little information for diagnosing the problem.

Therefore, a need exists for a device that can easily be installed on a power distribution system and quickly provide power line characterization and diagnostic information for communication of data signals.

SUMMARY OF THE INVENTION

An apparatus determines a characteristic of a portion of a power line. The apparatus includes a coupling device in communication with a processor. The coupling device receives a signal from a power line and the processor receives the signal from the coupling device and determines a characteristic of a portion of the power line based on the received signal.

The coupling device may include a hinged inductor having a toroidally shaped core of magnetically permeable material, a radio frequency choke, or an antenna. The received signal may include a broadband signal, a chirp signal, a multi-tone signal, a communication waveform burst, an orthogonal frequency division multiplexed communication waveform burst, or a signal including a pseudo-random number sequence.

The processor may determine a cross correlation, a bit error rate, a packet error rate, a signal-to-noise ratio, an amplitude response, a phase response, a frequency response, a delay power profile, a multipath characterization, a noise characterization, and an interference characterization. The processor may estimate a data rate for the portion of the power line based on the determined characteristic and a modulation scheme. The processor may store an indication of the determined characteristic and compare a determined characteristic to a previously stored characteristic.

The apparatus may further include a user interface in communication with the processor. The user interface may display the determined characteristic. The apparatus may further include a wireless interface in communication with the processor and an antenna in communication with the wireless interface, where the antenna transmits the determined power line characteristic via a radio frequency.

An apparatus sends a test signal for determining a characteristic of a portion of a power line. The apparatus includes a processor that generates a test signal and a coupling device in communication with the processor. The coupling device receives the test signal from the processor and communicates the test signal to the power line.

An apparatus determines a characteristic of a portion of a power line. The apparatus includes a processor that generates a test signal in a send mode and receives a signal from a power line in a receive mode. The processor operates in one of the send mode and the receive mode. The apparatus also includes a coupling device in communication with the processor. The coupling device communicates the test signal to the power line in the send mode and receives the signal from the power line in the receive mode.

One method of the present invention determines a characteristic of a portion of a power line. The method includes generating a test signal, communicating the test signal to a power line at a first location of the power line, receiving the test signal from the power line at a second location of the power line, and determining a characteristic, such as a broadband characteristic, of a portion of the power line based on the received test signal.

The method may include generating a series of test signals, communicating a series of test signals to the power line at the first location, receiving the series of test signals from the power line at the second location, and determining the broadband characteristic based the received series of test signals. The method may include storing the determined characteristic. The method may include generating a second test signal, communicating the second test signal to the power line proximate the first location of the power line, receiving the second test signal from the power line proximate the second location of the power line, determining a second broadband characteristic of the portion of the power line based on the received second test signal, and comparing the determined broadband characteristics. The method may include diagnosing the power line based on the comparison of broadband characteristics.

The above-listed features, as well as other features, of the apparatus and method will be more fully set forth hereinafter.

BRIEF DESCRIPTION OF THE DRAWINGS

The apparatus and method are further described in the detailed description that follows, by reference to the noted drawings by way of non-limiting illustrative embodiments of the apparatus and method, in which like reference numerals represent similar parts throughout the drawings. As should be understood, however, the apparatus and method are not limited to the precise arrangements and instrumentalities shown. In the drawings.

DETAILED DESCRIPTION OF ILLUSTRATIVE EMBODIMENTS

Power Line Communication System

Figure 1:
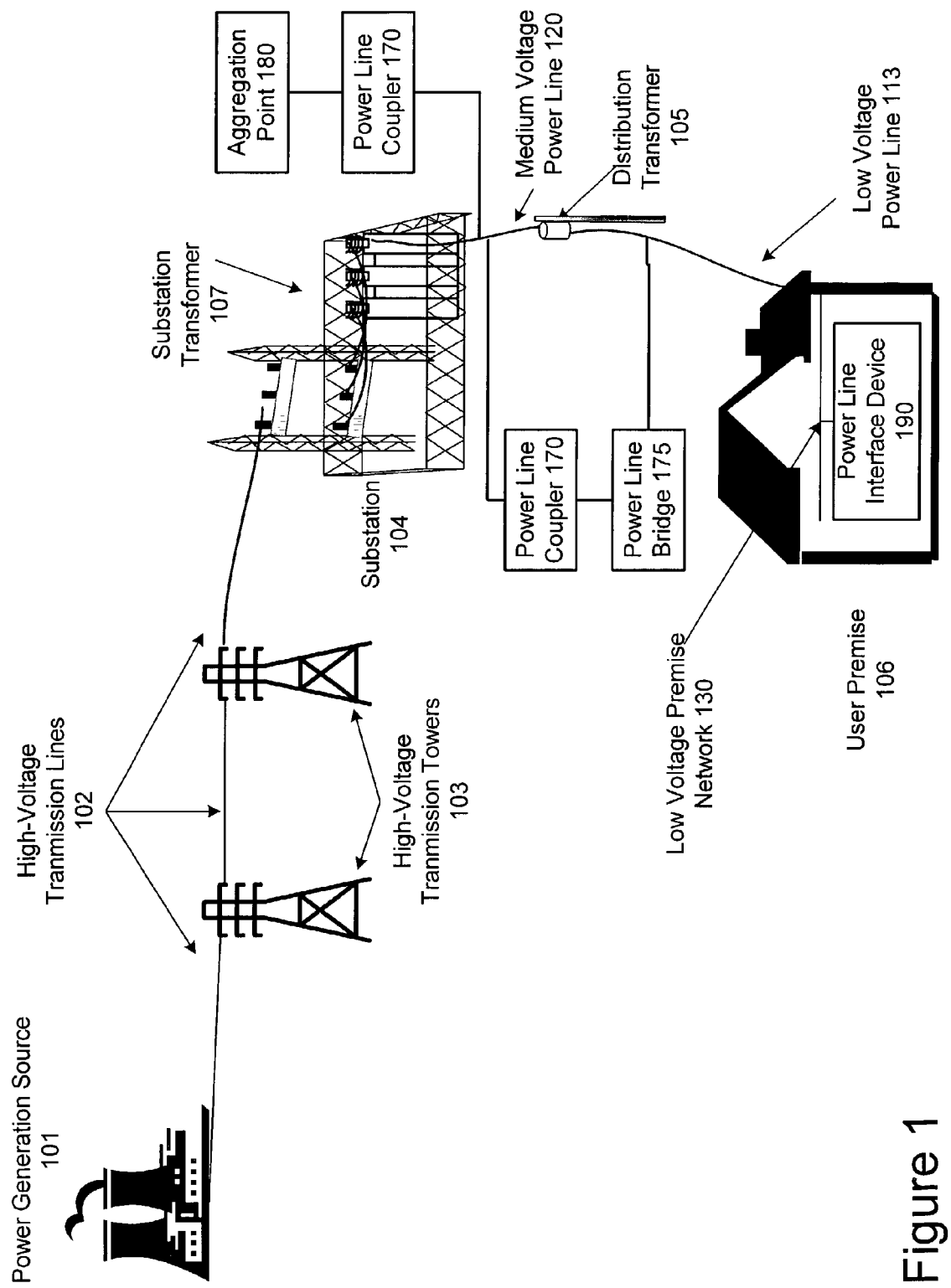
FIG. 1 is a diagram of an exemplary power line communication system with which the invention may be employed.

An exemplary power line communication system is shown in FIG. 1. As shown in FIG. 1, the power line communication system is implemented on a medium voltage half loop power distribution system that is common to the United States. Embodiments of the invention, however, may be employed with other power distribution systems, such as, for example, a high voltage delivery system that is common to European countries, as well as other power distribution systems.

The power distribution system includes components for power generation and power transmission and delivery. As shown in FIG. 1, the power distribution system includes a power generation source 101 that produces electric power. Power generation source 101 includes a generator (not shown) that creates the electrical power. The generator may be a gas turbine or a steam turbine operated by burning coal, oil, natural gas, or a nuclear reactor, for example. Power generation source 101 typically provides three-phase AC power. The generated AC power typically has a voltage as high as approximately 25,000 volts (V).

A transmission substation (not shown) increases the voltage from power generation source 101 to high-voltage levels for long distance transmission on high-voltage transmission lines 102. Typical voltages found on high-voltage transmission lines 102 range from 69 kilovolts (kV) to in excess of 800 kV. High-voltage transmission lines 102 are supported by high-voltage transmission towers 103. High-voltage transmission towers 103 are large metal support structures attached to the earth, so as to support transmission lines 102 and to provide a ground potential to the power distribution system. High-voltage transmission lines 102 carry the electric power from power generation source 101 to a substation 104.

In addition to high-voltage transmission lines 102, the power distribution system includes medium voltage power lines 120 and low voltage power line 113. Medium voltage typically is from about 7 kV to about 32 kV and low voltage typically is from about 100 V to about 240 V. As can be seen, power distribution systems typically have different voltage portions. Transformers are often used to convert between the respective voltage portions, e.g., between the high voltage portion and the medium voltage portion and between the medium voltage portion and the low voltage portion.

One such transformer is substation transformer 107 that is located at substation 104. Substation 104 acts as a distribution point in the power distribution system and substation transformer 107 steps-down voltages to reduced voltage levels. Specifically, substation transformer 107 converts the power on high-voltage transmission lines 102 from high voltage levels to medium voltage levels for medium voltage power lines 120. In addition, substation 104 may include an electrical bus (not shown) that serves to route the medium voltage power in multiple directions. Furthermore, substation 104 often includes circuit breakers and switches (not shown) that permit substation 104 to be disconnected from high-voltage transmission lines 102 when a fault occurs.

Substation 104 typically distributes power to at least one distribution transformer 105. Distribution transformer 105 may be a pole-top transformer located on a utility pole, a pad-mounted transformer located on the ground, or a transformer located under ground level. Distribution transformer 105 steps down the voltage to levels appropriate for a user premises 106, for example. Power is carried from substation transformer 107 to distribution transformer 105 over medium voltage power line 120. Power is carried from distribution transformer 105 to user premises 106 via low voltage power line 113. Also, distribution transformer 105 may function to distribute one, two, three, or more phase currents to multiple user premises 106. In the United States, for example, these local distribution transformers 105 typically feed anywhere from one to ten homes, depending upon the concentration of the user premises in a particular location, and typically feed user premises 106 with two phases of power. A "web" of wires distributes power within user premises 106. A user draws power on demand by plugging an appliance into a power outlet.

As described above, a power distribution system typically is separated into high voltage power lines, medium voltage power lines, and low voltage power lines (that extend to user premises 106). These power lines may be used for data communication as well as for power transmission and distribution.

The high-voltage power lines typically have the least amount of noise and least amount of reflections and therefore, these power lines have the highest potential bandwidth for data communications. The high-voltage power lines typically are not used for data communication, however, because of their extremely high-voltage.

The medium-voltage power lines typically have a relatively low amount of noise, and therefore have good potential bandwidth for data communications. This is convenient because it is the portion of the system that concentrates the bandwidth from the low-voltage portions (i.e., receives data from and supplies data to a plurality of users). The type of signal modulation used on this portion can be almost any signal modulation used in communications (Code Division Multiple Access (CDMA), Time Division Multiple Access (TDMA), Frequency Division Multiplex (FDM), Orthogonal Frequency Division Multiplex (OFDM), and the like).

Low-voltage power lines 113 typically have some noise present from electrical appliances and reflections due to the electrical circuits in these portions. These portions of the power distribution system may support a lower bandwidth than the medium-voltage power lines and therefore, may employ a more intelligent modulation scheme (typically with more overhead).

To communicate data signals to the power lines, a power line coupler 170 may be coupled to medium voltage power line 120. Power line coupler 170 may include, for example, a current transformer, an inductor, a capacitor, an antenna, and the like (each not shown). Power line bridge 175 communicates data signals with low voltage power line 113. Power line bridge 175 may include a modem, a data router, a modem, an electrically non-conductive device, a power line coupling device, and the like (each not shown).

Power line coupler 170 and power line bridge 175 communicate with each other, thereby allowing data signals to bypass transformer 105, thus avoiding the filtering of the high frequency data signal that otherwise would occur in transformer 105. Lower frequency power signals continue to flow from medium voltage power lines 120 to low voltage power lines 113 via transformer 105, thereby providing power to user premises 106.

At user premises 106, a user may plug a power line interface device 190 into a power outlet (not shown) to digitally connect a data appliance (not shown) to communicate data signals carried by low voltage power line 113. Power line interface device 190 serves as an interface for data appliances to access the power line communication system. Power line interface device 190 can have a variety of interfaces for user data appliances. For example, power line interface device 190 can include a RJ-11 Plain Old Telephone Service (POTS) connector, an RS-232 connector, a USB connector, a 10 Base-T connector, and the like. In this manner, a user can connect a variety of data appliances to the power line communication system. Further, multiple power line interface devices 190 can be plugged into power outlets in the user premises 106, each power line interface device 190 communicating over the same wiring in user premises 106.

Power line interface device 190 converts a signal provided by power line bridge 175 to a form appropriate for communication with a data appliance. For example, power line interface device 190 may convert an analog signal to a digital signal for receipt by a data appliance at user premises 106 and may convert a digital signal to an analog signal for data transmitted by a data appliance at user premises 106.

Service providers may connect to the power line communication system via an aggregation point 180 (via another power line coupler) that operates to allow access to communication on medium voltage power line 120. Aggregation point 180 may include a modem, a backhaul interface, and a backhaul link, and the like (each not shown).

Portable Power Line Characterization and Diagnostic Apparatus

Figure 2:
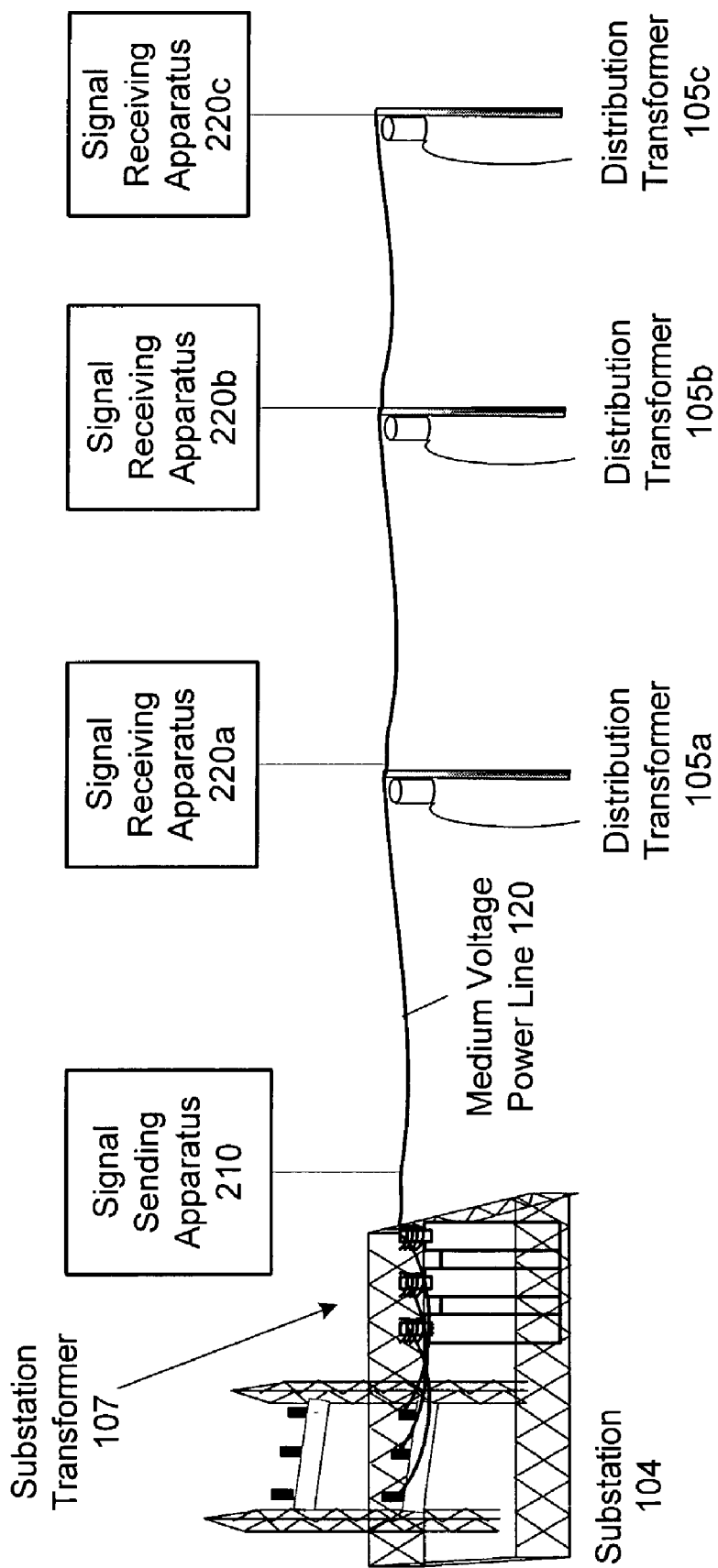
FIG. 2 is a diagram of a portion of an exemplary power line communication system having an illustrative signal sending apparatus and a plurality of illustrative signal receiving apparatuses coupled thereto, in accordance with an embodiment of the invention.

FIG. 2 illustrates a power line characterization and diagnostic apparatus applied to a power line communication system. As shown in FIG. 2, a signal sending apparatus 210 is coupled to medium voltage power line 120 proximate substation transformer 107. Signal sending apparatus 210, however, may be coupled to any point in the power line communication system, but is often coupled proximate substation transformer 107 to emulate the operation of aggregation point 180.

At least one signal receiving apparatus 220 is also coupled to medium voltage power line 120. Typically, a signal receiving apparatus 220 is coupled to medium voltage power line 120 proximate a distribution transformer 105. For example, as shown in FIG. 2, signal receiving apparatus 220a is located proximate distribution transformer 105a, signal receiving apparatus 220b is located proximate distribution transformer 105b, and signal receiving apparatus 220c is located proximate distribution transformer 105c. Signal receiving apparatus 220, however, may be coupled to any point in the power line communication system, but is often coupled proximate distribution transformer 105 to emulate the operation of power line bridge 175. While FIG. 2 illustrates multiple signaling receiving apparatuses for illustrative purposes, in practice only one may be necessary.

With such an arrangement of signal sending apparatus 210 and signal receiving apparatus 220, relevant portions of medium voltage power line 120 may be characterized and diagnosed. For example, using signal sending apparatus 210 and signal receiving apparatus 220a can provide power line characterization and diagnostics for the portion of the power line between a particular aggregation point and power line bridge. As such, the power line characterization and diagnostics may be measured for a portion of the power line communication system that is often used for data communication.

Figure 3:
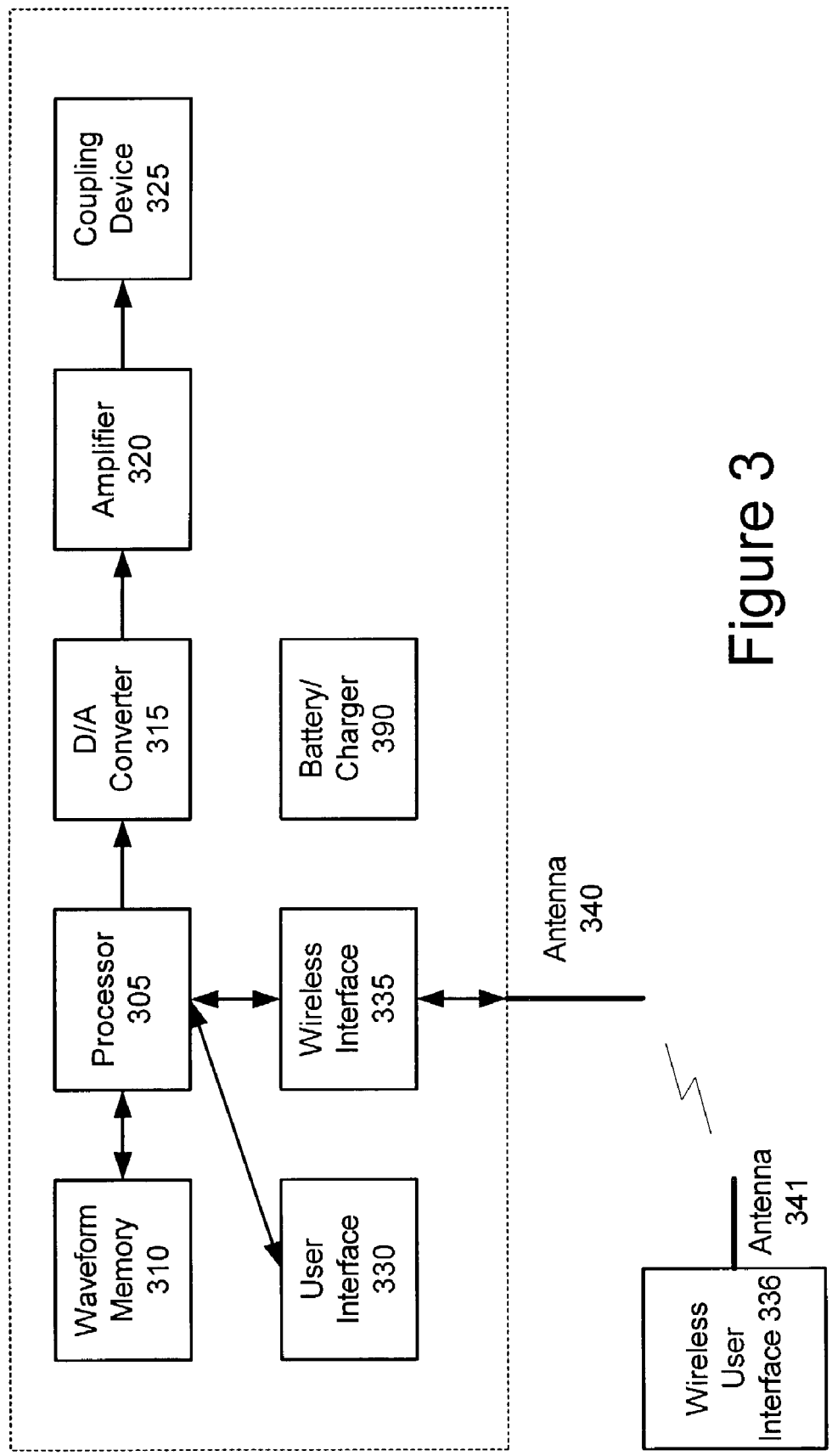
FIG. 3 is a block diagram of an illustrative signal sending apparatus, in accordance with an embodiment of the invention.

FIG. 3 shows an illustrative signal sending apparatus 210. As shown in FIG. 3, signal sending apparatus 210 may comprise a processor 305, a waveform memory 310, a digital to analog (D/A) converter 315, an amplifier 320, a coupling device 325, a wireless interface 335, an antenna 340, and a battery/charger 390. In addition, or instead of the wireless interface 335 and antenna 340, the device may include a user interface 330.

Processor 305, which may be a digital signal processor or the like, may receive a user selection of a test signal type and a user input to begin sending a test signal and in response to thereto, may generate a test signal and begin sending a test signal. The test signal may be one of a plurality of test signal types that are described in more detail below. The test signal that is generated by processor 305 typically is a digital signal and may be stored in waveform memory 310, which is in communication with processor 305. Processor 305 may generate the test signal based on a calculation, a stored test signal, or the like.

Alternatively, waveform memory 310 may store a predetermined test signal for use by processor 305. For example, waveform memory 310 may include a predetermined test signal for each type of test signal. In this case, processor 305 reads a test signal from waveform memory 310 and communicates the signal to D/A converter 315. Alternatively, D/A converter 315 may read a test signal directly from waveform memory 310. Waveform memory 310 may be any memory such as for example, random access memory (RAM), flash memory, and the like.

D/A converter 315 is in communication with waveform memory 310 and receives a digital test signal from waveform memory 310 or processor 305 and converts the digital test signal to an analog test signal for communication to the power line. Alternatively, processor 305 may communicate directly with D/A converter 315. D/A converter 315 typically is a high speed D/A converter. Typically, the analog test signal generated by D/A converter 315 is a low voltage signal and therefore, D/A converter 315 may communicate the analog test signal to amplifier 320 for amplification.

Amplifier 320 is in communication with D/A converter 315. Amplifier 320 receives the analog test signal from D/A converter 315 and amplifies the signal for communication to the power line.

Coupling device 325 (described in more detail below) receives the amplified analog test signal from amplifier 320 and couples the amplified analog test signal to the power line. The test signal may be received at another location on the power line by signal receiving apparatus 220 (described in more detail below) for characterization and diagnostics.

Processor 305 interfaces with a user through wireless user interface 336 (via wireless interface 335), user interface 330, or both. User interface 330 may comprise a keyboard, a keypad, a liquid crystal display, a flat panel display, and the like. User interface 330 communicates with processor 305 such that a user may enter, and processor 305 may receive, a user selection of test signal type, a user selection to begin sending a test signal, and the like. Moreover, user interface 330 may receive information from processor 305, such as for example, a characterization of a power line, a test signal, and the like, which may be conveyed visually and/or audibly to the user.

Wireless user interface 336, in a manner similar to user interface 330, may comprise a keyboard, a keypad, a liquid crystal display, a flat panel display, and the like. For example, wireless user interface 336 may comprise a laptop computer that includes a wireless transceiver. Wireless user interface 336 communicates with processor 305 such that a user may enter, and processor 305 may receive, a user selection of test signal type, a user selection to begin sending a test signal, a user selection of a series of test signals, and the like. Moreover, wireless user interface 336 may receive information from processor 305, such as for example, a characterization of a power line, a test signal, and the like, which may be conveyed visually and/or audibly to the user.

Wireless user interface 336 may comprise an antenna 341 to communicate with processor 305 via antenna 340 and wireless interface 335. A radio frequency interface, such as an interface using a protocol based on an IEEE 802.11b standard, a Bluetooth interface, or the like, may be used for communication between wireless user interface 336 and wireless interface 335. In this manner, a user may remotely control and receive data from signal sending apparatus 210. Moreover, data can be downloaded to a computer (e.g., a laptop acting as the wireless user interface 336) for storage and further analysis.

Battery/charger 390 may comprise a battery portion and a battery charger portion and may be coupled to elements of signal sending apparatus 210 to provide power for communicating a test signal to the power line and to provide for recharging of the battery portion. With such a battery/charger 390, signal sending apparatus 210 may be easily portable. Signal sending apparatus 210 is typically sized to be handheld.

Figure 4:
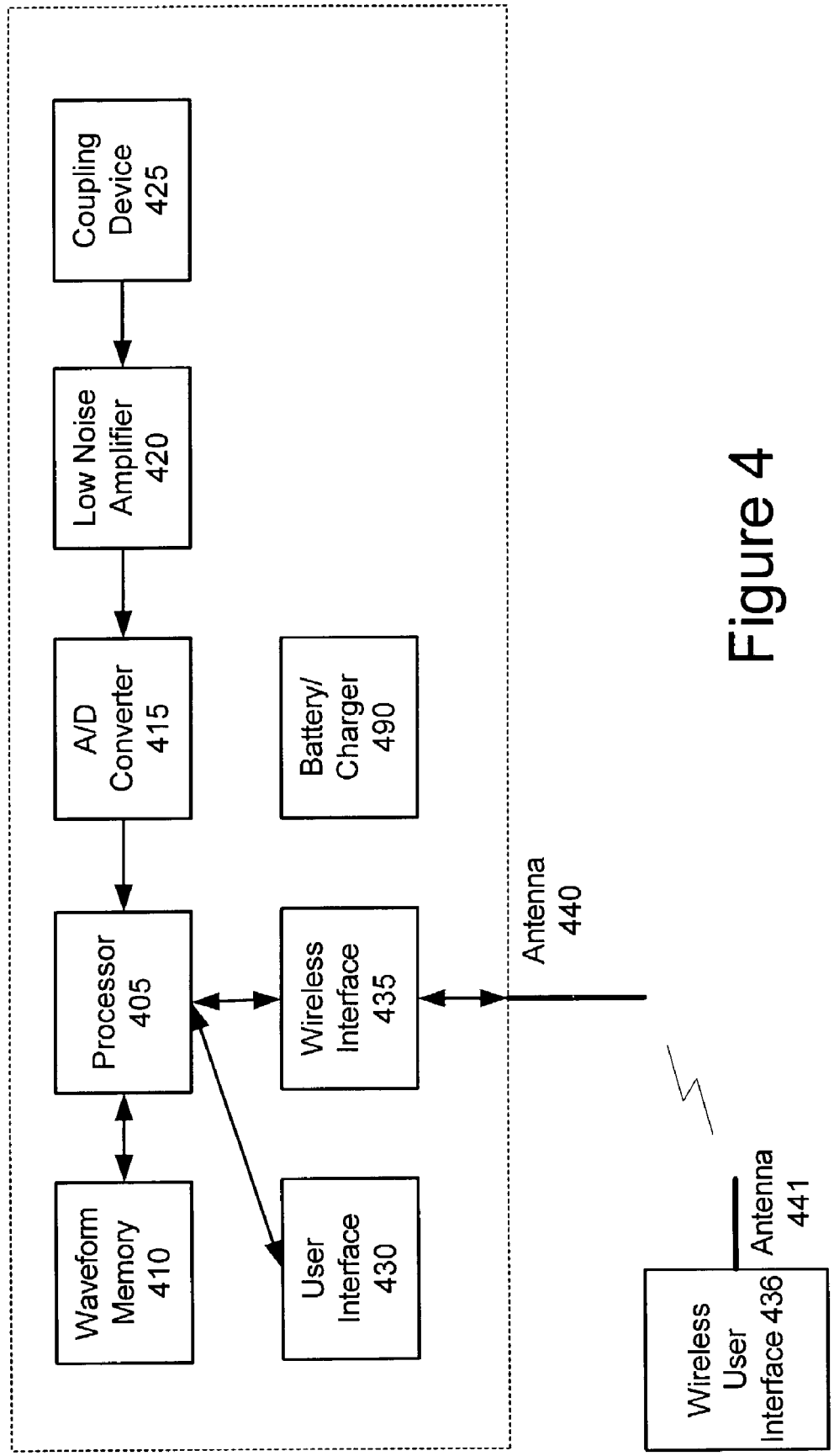
FIG. 4 is a block diagram of an illustrative signal receiving apparatus, in accordance with an embodiment of the invention.

FIG. 4 shows an illustrative signal receiving apparatus 210. As shown in FIG. 4, signal receiving apparatus 210 may comprise a processor 405, a waveform memory 410, an analog to digital (A/D) converter 415, a low noise amplifier 420, a coupling device 425, a user interface 430, a wireless interface 435, an antenna 440, and a battery/charger 490.

Processor 405, which may be a digital signal processor or the like, receives a test signal and receives a user selection of a characterization. The test signal may be one of a plurality of test signal types that are described in more detail below. Also, processor 405 may receive a series of test signal types. The characterization may be any one of the characterizations described below.

Typically the test signal is received via coupling device 425 (described in more detail below) that receives the test signal from the power line and communicates the received test signal to low noise amplifier 420. The test signal received from the power line typically is an analog test signal.

Low noise amplifier 420 is in communication with coupling device 425. Low noise amplifier 420 receives the analog test signal from coupling device 425 and amplifies the analog test signal for communication to A/D converter 415. Low noise amplifier 420 may include filtering and analog signal conditioning devices and may be designed (or selected) to reduce the amount of noise that it introduces into the amplified signal.

A/D converter 415 is in communication with low noise amplifier 420 and receives the amplified analog test signal from low noise amplifier 420 and converts the analog test signal to a digital analog test signal for communication to processor 405.

The digital test signal may be stored in waveform memory 410 which is in communication with processor 405 for characterization and diagnostics. Waveform memory 410 may be any memory such as for example, random access memory (RAM), flash memory, and the like.

Processor 405 may interface with a user through user interface 430, wireless user interface 436 (via wireless interface 435), or both, in a manner similar to user interface 330 and wireless user interface 336. Battery/charger 490 is similar to battery/charger 390. Consequently, a detailed description of these components is not repeated here. In fact, wireless user interfaces 336 and 436 may be the same device (e.g., a single laptop computer in communication with both signal sending apparatus 210 and signal receiving apparatus 220). Signal receiving apparatus 220 is typically sized to be handheld.

Figure 5:
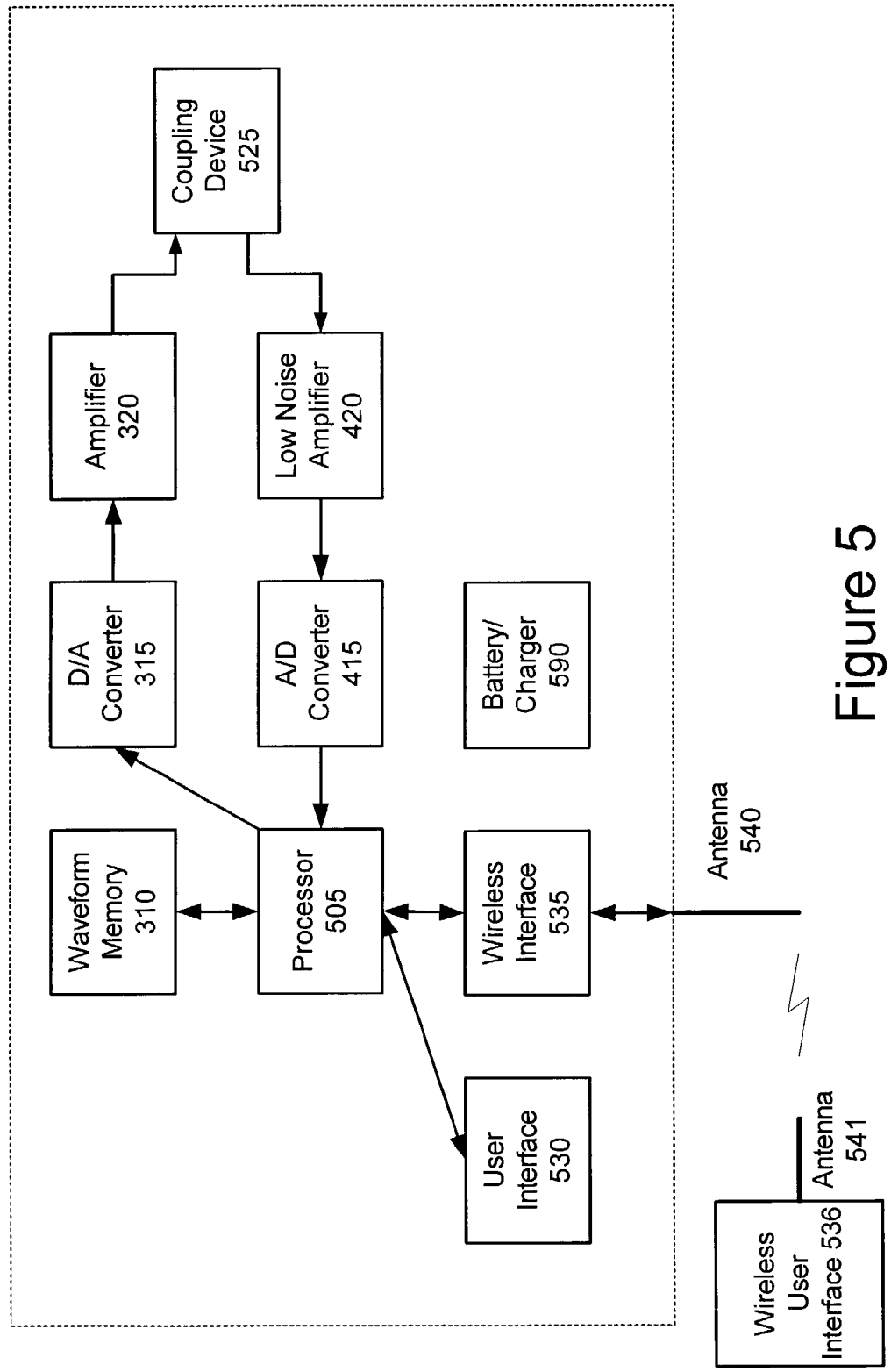
FIG. 5 is a block diagram of an illustrative signal sending and receiving apparatus, in accordance with an embodiment of the invention.

FIG. 5 shows an illustrative signal sending and receiving apparatus 510 capable of performing substantially the same functions as signal sending apparatus 210 and signal receiving apparatus 220. As shown in FIG. 5, signal sending and receiving (SSR) apparatus 510 may comprise a processor 505, a waveform memory 310, a digital to analog (D/A) converter 315, an amplifier 320, a coupling device 525, a digital to analog (D/A) converter 415, an amplifier 420, a wireless interface 535, an antenna 540, and battery/charger 590. In addition to or instead of wireless interface 535 and antenna 540, SSR apparatus 510 may include a user interface 530.

Processor 505, which may be a digital signal processor or the like, includes the functionality of processor 305 and 405. As such, processor 505 can cause signal sending and receiving apparatus 510 to function as signal sending apparatus 210 or signal receiving apparatus 220. Typically, a user selects whether apparatus is to operate in send mode or receive mode. Processor 505 receives such a selection via wireless user interface 536 (or user interface 530 as the case may be) and responds appropriately. In send mode, processor 505 functions similar to processor 305 and in receive mode, processor 505 functions similar to processor 405.

Processor 505 interfaces with a user through user interface 530, wireless user interface 536, or both, in a manner similar to user interface 330 and wireless user interface 336. Battery/charger 590 is similar to battery/charger 390. Signal sending and receiving apparatus 510 is typically sized to be handheld. Consequently, a detailed description of these components is not repeated here. As discussed above, however, wireless user interface 536 may comprise a portable computer with a wireless transceiver.

Figure 6:
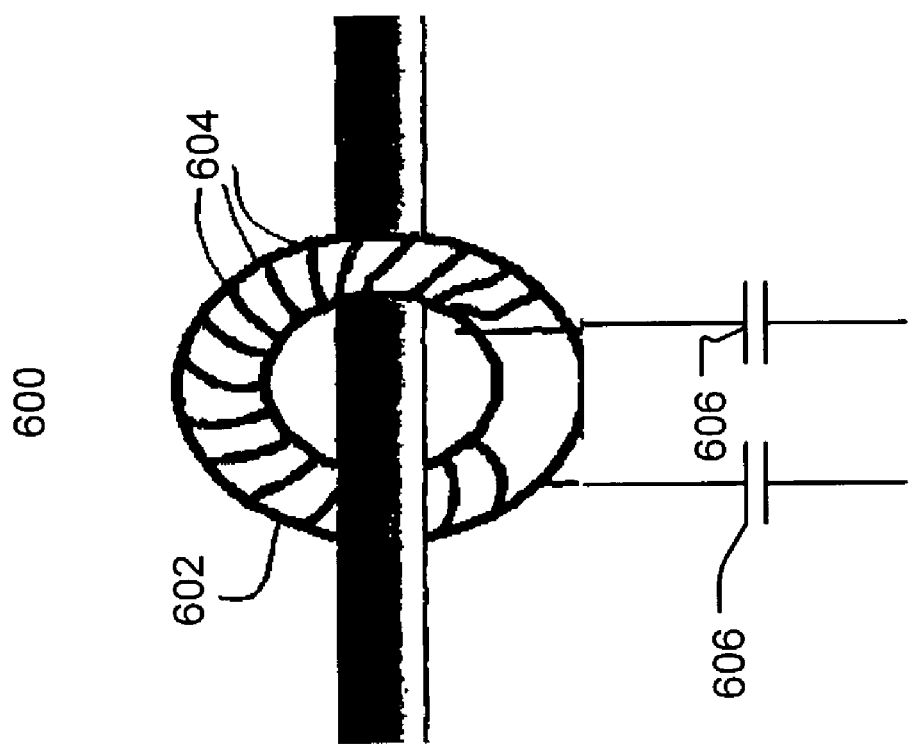
FIG. 6 is a diagram of an illustrative coupling device, in accordance with an embodiment of the invention.

Coupling device 525 may comprise a current transformer, an inductor, a capacitor, an antenna, and the like. FIG. 6, illustrates more details of an illustrative coupling device 600. As shown in FIG. 6, coupling device 600 may include an inductor 602 and capacitors 606.

Inductor 602 communicates data signals with a power line via inductive (i.e., magnetic) coupling. Inductor 602 may be a toroidally shaped inductor that is inductively coupled with medium voltage power line 120. Inductor 602 includes a toroidally shaped magnetically permeable core with windings 604 disposed to facilitate flux linkage of the test signal. The number and orientation of windings 604 typically is selected for increased flux linkage of the test signal, but not of the power line signal. Further, the permeability of the magnetic core typically is selected for high coupling with the test signal and a high signal-to-noise ratio. Also, the permeability characteristics of inductor 602 may be selected to reduce saturation of the core by the test signal. If the core becomes saturated, the test signal may become "clipped."

The power line may be disposed through inductor 602. To facilitate easy installation and minimal impact (or preferably no impact) to customer service, inductor 602 may include a hinge (or be mounted in an enclosure with two sections (e.g., halves) that are coupled together with a hinge). With such a hinge, inductor 602 (or housing) may simply snap around the power line using existing utility tools and techniques. In this manner, installation of inductor 602 can be performed without disrupting power to the power users and without stripping any insulation from the power line.

Inductor 602 is electrically connected to capacitors 606. Capacitors 606 provide some electrical isolation and may further provide filtering of the power signal from the test signal. That is, the test signal, which typically is a high frequency signal, passes across capacitors 606 while the power signal, which typically is a lower frequency (e.g., 50 or 60 Hz), is substantially prevented from passing across capacitors 606.

Figure 7:
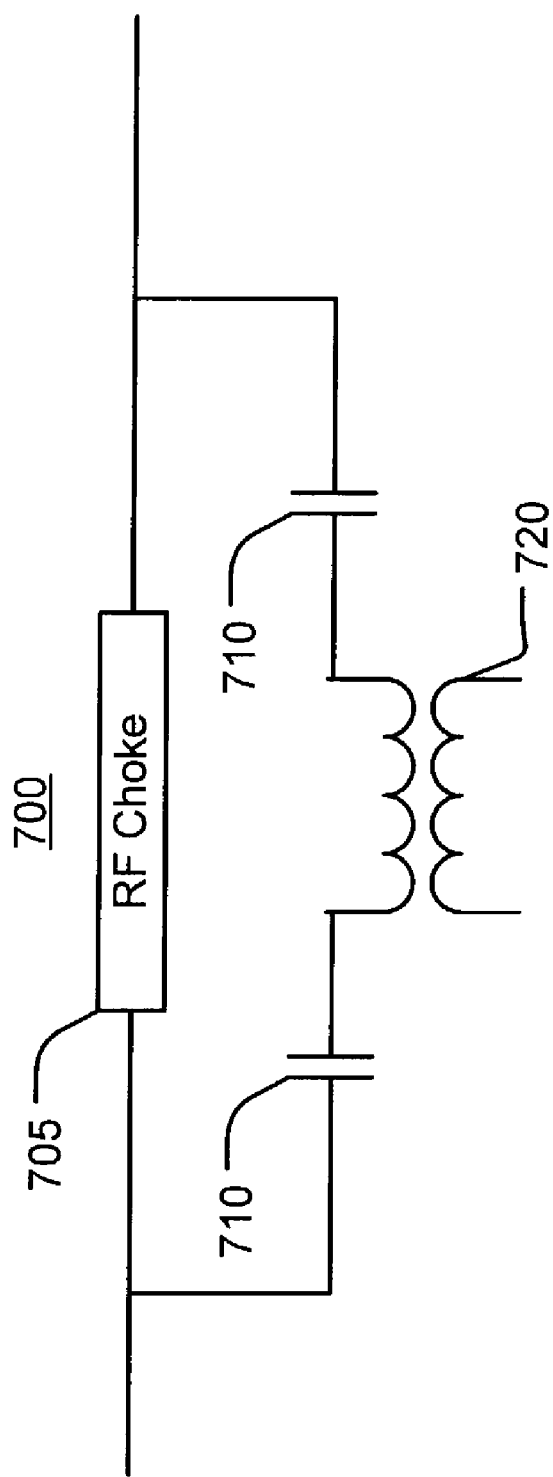
FIG. 7 is a diagram of another illustrative coupling device, in accordance with an embodiment of the invention.

FIG. 7 illustrates another embodiment of a coupling device 700. As shown in FIG. 7, coupling device 700 includes a radio frequency (RF) choke 705, capacitors 710, and a transformer 720.

RF choke 705 may be disposed around the power line and may comprise ferrite beads or cores. RF choke 705 operates as a low pass filter. That is, low frequency signals (e.g., a power signal having a frequency of 50 or 60 Hz) pass through RF choke 705 relatively unimpeded (i.e., RF choke 705 can be modeled as a short circuit to low frequency signals). High frequency signals (such as the test signals or data signals), however, do not pass through RF choke 705; rather, they are impeded by RF choke 705 (i.e., RF choke 705 can be modeled as a high impedance circuit to high frequency signals). As such, the voltage across RF choke 705 includes test signals but substantially no power signals. This voltage (i.e., the voltage across RF choke 705) is applied to transformer 720 via capacitors 710 to receive test signals from the power line. To transmit test signals to the power line, a test signal is applied to transformer 720, which in turn communicates the test signal to the power line through capacitors 710.

Capacitors 710 provide some electrical isolation between the power line and transformer 720. Capacitors 710 further provide filtering of stray power signals. That is, the test signal passes across capacitors 710 while any power signal is substantially prevented from passing across capacitors 710. Such filtering can be implemented elsewhere within the system or not implemented at all.

Transformer 720 may operate as a differential transceiver. That is, transformer 720 may operate to communicate test signals through the power line. Transformer 720 also provides some electrical isolation.

With such coupling devices, signal sending apparatus 210 and signal receiving apparatus 220 (or SSR apparatus 510) may be placed onto the power line or placed by an insulated pole from the ground onto the power line (e.g., by a lineman). In this manner, apparatus 210 and 220 may operate in an un-tethered, "bird-on-the-wire" fashion on the power line. That is, apparatus 210 and 220 may be placed on the power line and may be operated from the ground (e.g., via wireless user interface 336) without having a physical connection between the user on the ground and the apparatus 210, 220. Alternatively, apparatus 210, 220 may be placed on the power line and operated from user interface 336. Alternatively, the coupling device 325, 425, and 525 may be physically separated from the apparatus. In this case, coupling device 325, 425, and 525 may be placed on the power line and may communicate with the remainder of apparatus 210, 220, 510 for example, over wires. With such an embodiment, coupling device 325, 425, 525 may be electrically isolated from the remainder of apparatus 210, 220, 510 for increased safety.

Figure 8:
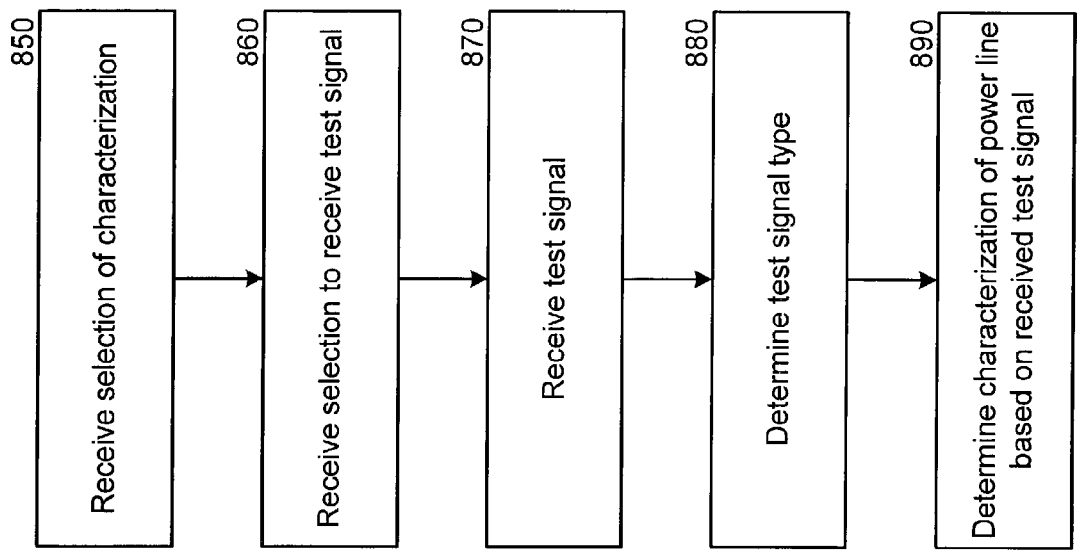
FIGS. 8a and 8b are flow diagrams of illustrative methods for characterizing and diagnosing a portion of a power line communication system, in accordance with an embodiment of the invention.
Figure 8:
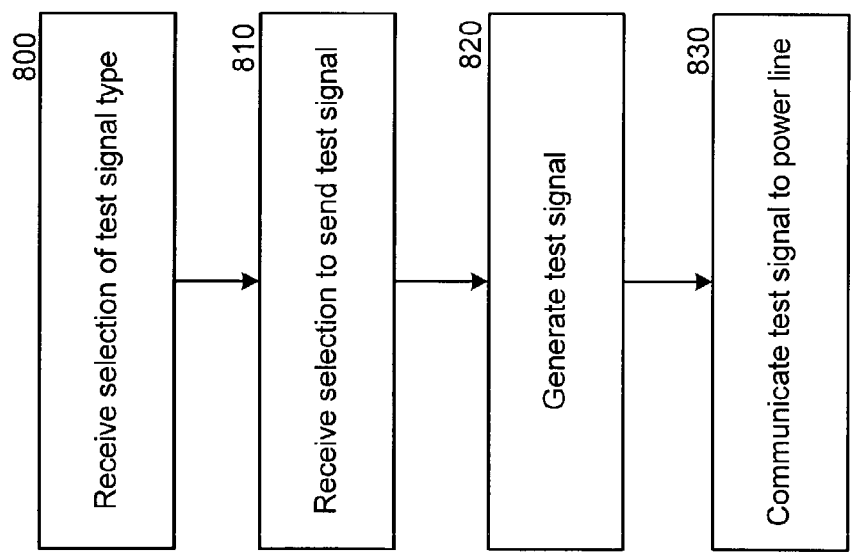

In any event, signal sending apparatus 210 and signal receiving apparatus 220 (and SSR apparatus 510) may be used to characterize and diagnose the power line. FIG. 8*a* shows an illustrative method for characterizing the power line. As shown in FIG. 8*a* at step 800, processor 305 receives a selection of a test signal type (e.g., from user interface 330 or wireless user interface 336). For example, processor 305 may receive a selection of a chirp type test signal. A chirp signal is generally a broadband test signal that covers a broad range of frequencies. More specifically, a broadband channel is a channel that is at least 20 KHz wide, more preferably 1 MHz wide, still more preferably 6 MHz wide, and most preferably at least 10 MHz wide. Thus, a broadband test signal facilitating providing a broadband characteristic would be transmitted over (and provide a characteristic over) the broadband channel. Processor 305 may alternatively receive a selection of a pseudo-random number (PN) test signal. Pseudo-random number signals include a pseudo-random sequence of numbers and may be used in the simulation of a spread spectrum signal to determine channel characteristics. A PN test signal is a test signal that covers a relatively wide range of frequencies. Another test signal type is a continuous wave (CW) signal. A continuous wave signal may be an unmodulated single frequency signal. The continuous wave signal may be swept to determine channel response. Still other test signal types include a multi-tone waveform, a swept sine signal, a modulated predefined data packet, and the like. Typically, the modulated predefined data packet uses the same modulation scheme as used in the power line communication system, however, any modulation scheme may be used. For example, several modulation schemes may be characterized to assist in selection of a modulation scheme to be implemented in the power line communication system. Moreover, processor 305 may receive a selection (e.g., a user input indicating a request or selection) to execute a series of tests to characterize the power line communication system.

At step 810, processor 305 receives a selection to send a test signal. Alternatively, processor 305 may begin sending a test signal upon receiving the selection of test signal type at step 800, or may begin sending a predefined test signal upon power on or after some predefined time after selection of a test signal type.

At step 820, processor 305 generates a test signal of the type selected (or predetermined) and may store the generated test signal in waveform memory 310. Alternately, processor 305 may retrieve a pre-stored test signal from memory 310. Processor 305 may generate (or retrieve) one test signal of the selected type, may continually repeat generating (and/or retrieving) one test signal type, may continually sequence through generating (or retrieving) different types of test signals (e.g., such as predetermined sequence of test signals), and the like.

At step 830, signal sending apparatus communicates the test signal to the power line through coupling device 325. For example, the processor may read a digital test signal from waveform memory 310 and provide the digital test signal to D/A converter 315 to convert the digital test signal to an analog test signal. Amplifier 320 may amplify the analog test signal and coupling device 325 may communicate the amplified analog test signal to the power line.

To perform a characterization or a diagnosis, signal receiving apparatus 220 (or SSR apparatus 510) receives the test signal from the power line. Signal receiving apparatus 220 may be located in a different location from signal sending apparatus 210. For example, signal sending apparatus 210 may be located proximate an aggregation point 180 or at the location of a potential aggregation point and signal receiving apparatus 220 may be located proximate a power line bridge 175 or at the location of a potential power line bridge. However, for some power line characterizations, signal sending apparatus 210 and signal receiving apparatus 220 may be located proximate each other or several signal sending and receiving apparatuses 510 may be used. Also, rather than using a signal sending apparatus 210 and a signal receiving apparatus 220, two or more signal sending and receiving apparatus 510 may be used, with at least one signal sending and receiving apparatus 510 functioning to send a test signal and at least one signal sending and receiving apparatus 510 functioning to receive a test signal and perform a characterization and/or diagnosis. Moreover, aggregation point 180 may be configured to communicate test signals to the power line and a signal receiving apparatus 220 (or SSR apparatus 510) may receive the test signal and perform a characterization and/or diagnosis.

FIG. 8*b* shows an illustrative method of performing a characterization. As shown in FIG. 8*b* at step 850, processor 405 receives a selection of a characterization type (e.g., from user interface 430 or wireless user interface 436). For example, processor 405 may receive a selection of a channel frequency response characterization, an amplitude response versus frequency characterization, a phase response versus frequency characterization, a channel attenuation versus frequency (or path loss) characterization, a delay spread characterization including time delay versus frequency or maximum time delay versus frequency, a delay profile characterization including power versus time delay, a background noise characterization including background noise signal power versus frequency, an interference level characterization, and the like. The delay profile characterization may be determined from impulse responses that resulted from cross-correlation of the sent test signal and the received test signal. The delay profile may include a maximum delay, an average delay, a mean delay, a root-mean-square delay, and the like. A background noise characterization typically is performed by signal receiving apparatus 220 and without signal sending apparatus 210. Processor 405 may alternatively receive a user selection to compile packet error rate statistics. Such a power line characterization corresponds to signal sending apparatus 210 sending a predefined data packet, typically using the same modulation scheme as that used in the power line communication system. Processor 405 may determine a bit error rate, a packet error rate, a signal-to-noise ratio, and the like.

Also at step 850, processor 405 may also receive an indication of the type of test signal to be received. Alternatively, processor 405 may determine the test signal type from the received test signal, as described in more detail below at step 880.

At step 860, processor 405 receives a selection to receive a test signal. Alternatively, processor 305 may begin receiving a test signal upon receiving the selection of a characterization at step 850 or upon powering on signal receiving apparatus 220. Thus, in some embodiments or configurations, the signal receiving apparatus 220 may always be prepared to receive (and store) and incoming test signal.

At step 870, processor 405 receives a test signal. Processor 405 may receive one test signal, may continually repeat receiving multiple test signals of one test signal type, may continually sequence through receiving multiple test signals of different test signal type, and the like. Processor 405 receives the test signal via coupling device 425. In more detail, low noise amplifier 420 receives the analog test signal from coupling device 425 and low noise amplifier 420 may amplify the analog test signal. D/A converter 415 may receive the analog test signal from low noise amplifier 420 and convert the analog test signal to a digital test signal, which is received by processor 405 and stored in waveform memory 410.

At step 880, processor 405 determines the test signal type associated with the received test signal. Processor 405 may perform a recognition of test signal type. That is, processor 405 may analyze the received digital test signal and determine whether the test signal is a chirp signal, a PN sequence signal, or the like. Alternatively, processor 405 may receive test signal type from a user interface (e.g., user interface 430 or wireless user interface 436 at step 850). In addition, the test signal may be identified in one or more data packets transmitted from the signal send apparatus 210 and received through the power line.

At step 890, processor 405 determines a characterization of a portion of the power line based on the received digital test signal and the selected characterization. Processor 405 (as well as processors 305 and 505) may include its own memory (e.g., ROM, PROM, EPROM, and/or RAM) for storing executable program code and variables. The characterization of the power line based on the received test signal is thus accomplished through the execution of suitable program code that includes algorithms for determining the selected characterization(s) based on the received test signal as will be understood to those skilled in the art. The characterization and/or the received digital test signal may be stored in a data store (e.g., a memory). In an alternate embodiment, the received test signal is stored upon reception. After reception, the user may supply an input of the selection of the type of characterization (e.g., step 850) to be performed, which is then performed by processor 405 (or 505) at step 890.

Alternatively, processor 405 may perform a diagnosis of the power line communication system. To diagnose a portion of power line communication system, a power line characterization is determined and compared to a previously determined and stored power line characterization or received digital test signal.

Processor 405 may also cause the characterization and/or diagnosis to be displayed (e.g., on a user interface). In this manner, the user may be presented with power line characterization information for a portion of the power line. Moreover, each distribution transformer location may be tested in turn in this fashion, while signal sending apparatus 210 remains proximate aggregation point 180, thereby providing a characterization of various portions of the power line.

As stated above, characterization or diagnosis information and data may be downloaded to a computer for storage thereon. This information and data can be stored and archived, then later retrieved for comparison, if problems develop with the power line communication system later in time. The signal sending apparatus 210 and signal receiving apparatus 220 can be used in "real-time" to determine if adjustments to the power line (e.g., using ferrites or other techniques) provide a performance improvement.

The invention is directed to a power line characterization and diagnostic apparatus. A signal sending apparatus generates a test signal and communicates the test signal to a power line. A signal receiving apparatus receives the test signal from the power line and performs a characterization based on the received signal. With such an apparatus, a deployment crew may attach the apparatus to a portion of the power line in interest and within a short time, be provided with a characterization of that portion of the power line, thereby allowing the deployment crew to determine the characteristics of the power line, diagnose potential problems in an installation, and optimize a given power line communication system installation for increased performance. In addition, the invention may provide an output (e.g., on a display) indicating whether or not the power line is suitable for supplying power line communications (e.g., at a predetermined minimum bandwidth) or an output relating to the maximum, average, or minimum bandwidth that the power line may supply or can supply (e.g., with reasonable certainty). In doing so, the received test signal may be compared with threshold levels or pre-stored data to determine acceptability or determine potential bandwidths of the power line.

Portions of the invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, ROM, PROM, EPROM, EEPROM, magnetic tape, flash memory, hard disk drive, or any other machine-readable storage medium, wherein, when the program code is loaded into and executed by a machine, such as a computer, the machine becomes an apparatus for practicing the invention. Portions of the invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is to be understood that the foregoing illustrative embodiments have been provided merely for the purpose of explanation and are in no way to be construed as limiting of the invention. Words which have been used herein are words of description and illustration, rather than words of limitation. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. An apparatus for determining a characteristic of a portion of a power line carrying a low frequency power signal and a high frequency data signal, the apparatus comprising:
    a coupling device configured to couple the high frequency data signal from the power line while substantially preventing the flow of the power signal therethrough; and
    a processor in communication with the coupling device, the processor receives the signal from the coupling device and determines a characteristic of a portion of the power line based on the received signal.

2. The apparatus as recited in claim 1, wherein the received signal is an analog signal and the apparatus further comprises:
    an analog to digital converter in communication with the coupling device and the processor, the analog to digital converter converts the received analog signal to a digital signal for the processor.

3. The apparatus as recited in claim 2, further comprising a data store and wherein the digital signal is stored in the data store.

4. The apparatus as recited in claim 1, wherein the coupling device comprises an inductor having a toroidally shaped core of magnetically permeable material.

5. The apparatus as recited in claim 1, wherein the coupling device comprises a radio frequency choke.

6. The apparatus as recited in claim 1, wherein the signal comprises a series of test signal types.

7. The apparatus as recited in claim 1, wherein the received signal comprises one of a chirp signal, a multi-tone signal, a communication waveform burst, an orthogonal frequency division multiplexed communication waveform burst, and a signal including a pseudo-random number sequence.

8. The apparatus as recited in claim 7, wherein the processor recognizes a type of signal received based on the received signal.

9. The apparatus as recited in claim 1, wherein the processor determines at least one of a cross correlation, a bit error rate, a packet error rate, a signal-to-noise ratio, an amplitude response, a phase response, a frequency response, a delay power profile, a multipath characterization, a noise characterization, and an interference characterization.

10. The apparatus as recited in claim 1, wherein the processor estimates a data rate for the portion of the power line based on the determined characteristic and a modulation scheme.

11. The apparatus as recited in claim 1, wherein the processor stores an indication of the determined characteristic.

12. The apparatus as recited in claim 11, wherein the processor compares the determined characteristic to a previously stored characteristic.

13. The apparatus as recited in claim 1, further comprising a user interface in communication with the processor, the user interface displays the determined characteristic.

14. The apparatus as recited in claim 1, further comprising:
a wireless interface in communication with the processor; and
an antenna in communication with the wireless interface, the antenna transmits the determined power line characteristic via a radio frequency.

15. The apparatus as recited in claim 1, further comprising an amplifier in communication with the coupling device and the processor, the amplifier amplifies the received signal.

16. An apparatus for sending a test signal for determining a characteristic of a portion of a power line carrying a low frequency power signal and a high frequency data signal, the apparatus comprising:
a processor that generates a test signal; and
a coupling device in communication with the processor and configured to couple the high frequency data signal from the power line while substantially preventing the flow of the power signal therethrough, the coupling device receives the test signal from the processor and communicates the test signal to the power line.

17. The apparatus as recited in claim 16, wherein the generated test signal is a digital test signal and the apparatus further comprises:
a digital to analog converter in communication with the coupling device and the processor, the digital to analog converter converts the generated digital test signal to an analog test signal.

18. The apparatus as recited in claim 17, further comprising an amplifier in communication with the digital to analog converter and the coupling device, the amplifier amplifies the analog test signal.

19. The apparatus as recited in claim 16, wherein the coupling device comprises a inductor having a toroidally shaped core of magnetically permeable material.

20. The apparatus as recited in claim 16, wherein the coupling device comprises a radio frequency choke.

21. The apparatus as recited in claim 16, wherein the test signal comprises one of a chirp signal, a multi-tone signal, a communication waveform burst, an orthogonal frequency division multiplexed communication waveform burst, and a signal including a pseudo-random number sequence.

22. The apparatus as recited in claim 16, wherein the test signal comprises a series of individual test signals.

23. The apparatus as recited in claim 16, further comprising a user interface in communication with the processor, the user interface communicates information for selecting a test signal.

24. The apparatus as recited in claim 23, wherein the user interface is a wireless user interface comprising a wireless transceiver.

25. The apparatus as recited in claim 16, further comprising a user interface in communication with the processor, the user interface communicates information for selecting and initiating a test signal.

26. The apparatus as recited in claim 16, further comprising:
a wireless interface in communication with the processor; and
an antenna in communication with the wireless interface, the antenna communicates information for selecting and initiating a test signal.

27. An apparatus for determining a characteristic of a portion of a power line carrying a low frequency power signal and a high frequency data signal, the apparatus comprising:
a processor that generates a test signal in a send mode, the processor operates in one of the send mode and a receive mode; and
a coupling device in communication with the processor, and configured to couple the high frequency data signal from the power line while substantially preventing the flow of the power signal therethrough, the coupling device communicates the test signal to the power line in the send mode and receives a test signal from the power line in the receive mode.

28. The apparatus as recited in claim 27, wherein the received signal is an analog signal, the test signal is a digital test signal, and the apparatus further comprises:
an analog to digital converter in communication with the coupling device and the processor, the analog to digital converter converts the received analog signal to a digital signal in the receive mode; and
a digital to analog converter in communication with the coupling device and the processor, the digital to analog converter converts the generated digital test signal to an analog test signal in the send mode.

29. The apparatus as recited in claim 27, further comprising a data store and wherein the digital signal is stored in the data store.

30. The apparatus as recited in claim 27, wherein the received signal comprises one of a chirp signal, a multi-tone signal, a communication waveform burst, an orthogonal frequency division multiplexed communication waveform burst, and a signal including a pseudo-random number sequence.

31. The apparatus as recited in claim 27, wherein the processor determines at least one of a cross correlation, a bit error rate, a packet error rate, a signal-to-noise ratio, an amplitude response, a phase response, a frequency response, a delay power profile, a multipath characterization, a noise characterization, and an interference characterization.

32. The apparatus as recited in claim 27, wherein the processor estimates a data rate for the portion of the power line based on the determined characteristic and a modulation scheme.

33. The apparatus as recited in claim 27, wherein the processor stores an indication of the determined characteristic.

34. The apparatus as recited in claim 33, wherein the processor compares the determined characteristic to a previously stored characteristic.

35. The apparatus as recited in claim 27, further comprising a user interface in communication with the processor, the user interface displays the determined power line characteristic.

36. A method for determining a characteristic of a portion of a power line carrying a low frequency power signal and a high frequency data signal, the method comprising:
- generating a high frequency test signal;
- communicating the high frequency test signal to a power line at a first location of the power line;
- receiving the high frequency test signal from the power line at a second location of the power line, while substantially filtering the low frequency power signal; and
- determining a characteristic of a portion of the power line based on the received test signal.

37. The method as recited in claim 36, wherein:
- generating the test signal comprises generating a series of test signals;
- communicating the test signal to the power line at the first location comprises communicating a series of test signals to the power line at the first location;
- receiving the test signal from the power line at the second location comprises receiving the series of test signals from the power line at the second location; and
- determining the characteristic comprises determining the characteristic based the received series of test signals.

38. The method as recited in claim 37, further comprising for each received test signal, recognizing a type of test signal based on the received test signal.

39. The method as recited in claim 36, further comprising storing the determined characteristic.

40. The method as recited in claim 39, further comprising
- generating a second test signal;
- communicating the second test signal to the power line proximate the first location of the power line;
- receiving the second test signal from the power line proximate the second location of the power line;
- determining a second broadband characteristic of the portion of the power line based on the received second test signal; and
- comparing the determined broadband characteristics.

41. The method as recited in claim 40, further comprising diagnosing the power line based on the comparison of broadband characteristics.

* * * * *

UNITED STATES PATENT AND TRADEMARK OFFICE
CERTIFICATE OF CORRECTION

PATENT NO.       : 7,076,378 B1
APPLICATION NO.  : 10/293799
DATED            : July 11, 2006
INVENTOR(S)      : Huebner It is certified that error appears in the above-identified patent and that said Letters Patent is hereby corrected as shown below:

On the face page, in field (54), in "Title", in column 1, line 2, delete "CHARACTERISTICS" and insert -- CHARACTERIZATIONS --, therefor.

On page 2, in field (56), under "U.S. Patent Documents", in column 1, line 40, delete "340/310 R" and insert -- 340/310 A --, therefor.

On page 3, in field (56), under "U.S. Patent Documents", in column 1, line 6, delete "B1" and insert -- B2 --, therefor.

On page 3, in field (56), under "U.S. Patent Documents", in column 1, line 44, delete "Zakitzky et al." and insert -- Zalitzky et al. --, therefor.

On page 3, in field (56), under "Other Publicatons", in column 2, line 28, delete ""Tokhoku" and insert -- "Tohoku --, therefor.

On page 3, in field (56), under "Other Publications", in column 2, lines 31-32, delete "(http://www.tohoku-epco.co.ip/profil/kurozu/c_vol8_1/art04/htm)." and insert -- (http://www.tohoku-epco.co.jp/profil/kurozu/c_vol8_1/art04.htm). --, therefor.

On page 4, in field (56), under "Other Publications", in column 1, line 1, delete "entiled," and insert -- entitled, --, therefor.

On page 4, in field (56), under "Other Publications", in column 1, lines 4-5, delete "Telecommunication" and insert -- Telecommunications --, therefor.

On page 4, in field (56), under "Other Publications," in column 1, line 6, insert -- pp. -- before "71-76.".

On page 4, in field (56), under "Other Publications," in column 1, lines 18-19, delete "www.archnetco.com/english/product/product_sl.html" and insert -- www.archnetco.com/english/product/product_sl.htm, --, therefor.

On page 4, in field (56), under "Other Publications," in column 1, line 24, delete "With" and insert -- with --, therefor.

On page 4, in field (56), under "Other Publications", in column 1, line 28, delete "148.5kz-" and insert -- 148.5kHz- --, therefor.

On page 4, in field (56), under "Other Publications", in column 1, line 29, delete "Electricitiy" and insert -- Electricity --, therefor.

UNITED STATES PATENT AND TRADEMARK OFFICE
CERTIFICATE OF CORRECTION

PATENT NO. : 7,076,378 B1
APPLICATION NO. : 10/293799
DATED : July 11, 2006
INVENTOR(S) : Huebner It is certified that error appears in the above-identified patent and that said Letters Patent is hereby corrected as shown below:

On page 4, in field (56), under "Other Publications", in column 1, line 30, insert -- pp. -- before "1-11.".

On page 4, in field (56), under "Other Publications", in column 1, line 33, delete "pp" insert -- pp. --, therefor.

On page 4, in field (56), under "Other Publications", in column 1, line 35, delete "No" and insert -- No. --, therefor.

On page 4, in field (56), under "Other Publications", in column 1, line 39, insert -- pp. -- before "183-185.".

On page 4, in field (56), under "Other Publications", in column 1, line 41, delete "Ref" and insert -- Ref. --, therefor.

On page 4, in field (56), under "Other Publications", in column 1, line 45, delete "pp" insert -- pp. --, therefor.

On page 4, in field (56), under "Other Publications", in column 1, line 49, delete "COmpany" and insert -- Company --, therefor.

On page 4, in field (56), under "Other Publications", in column 1, line 52, delete "Trnasactions" and insert -- Transactions --, therefor.

On page 4, in field (56), under "Other Publications", in column 1, line 53, insert -- pp. -- before "1760-1768.".

On page 4, in field (56), under "Other Publications", in column 1, line 55, insert -- pp. -- before "301-307.".

On page 4, in field (56), under "Other Publications", in column 1, line 59, insert -- pp. -- before "617-627.".

On page 4, in field (56), under "Other Publications", in column 1, line 62, insert -- pp. -- before "338-".

On page 4, in field (56), under "Other Publications", in column 1, line 64, delete "Servosytem" and insert -- Servosystem --, therefor.

UNITED STATES PATENT AND TRADEMARK OFFICE
CERTIFICATE OF CORRECTION

PATENT NO. : 7,076,378 B1
APPLICATION NO. : 10/293799
DATED : July 11, 2006
INVENTOR(S) : Huebner It is certified that error appears in the above-identified patent and that said Letters Patent is hereby corrected as shown below:

On page 4, in field (56), under "Other Publications", in column 2, line 2, insert -- pp. -- before "360-369.".

On page 4, in field (56), under "Other Publications", in column 2, line 6, delete "pp" and insert -- pp. --, therefor.

On page 4, in field (56), under "Other Publications", in column 2, line 9, insert -- pp. -- before "940-945.".

On page 4, in field (56), under "Other Publications", in column 2, line 16, insert -- pp. -- before "650-655.".

On page 4, in field (56), under "Other Publications", in column 2, line 17, delete "Lim" and insert -- Lim, --, therefor.

On page 4, in field (56), under "Other Publications", in column 2, line 20, insert -- pp. -- before "451-456.".

On page 4, in field (56), under "Other Publications", in column 2, line 23, after "1976" insert -- , --.

On page 4, in field (56), under "Other Publications", in column 2, line 28, insert -- pp. -- before "517-520.".

On page 4, in field (56), under "Other Publications", in column 2, line 31, insert -- pp. -- before "952-958.".

On page 4, in field (56), under "Other Publications", in column 2, line 33, insert -- pp. -- before "87-91.".

On page 4, in field (56), under "Other Publications", in column 2, line 36, delete "pp" insert -- pp. --, therefor.

On page 4, in field (56), under "Other Publications", in column 2, line 39, delete "pp" insert -- pp. --, therefor.

On page 4, in field (56), under "Other Publications", in column 2, line 43, insert -- pp. -- before "532-537.".

UNITED STATES PATENT AND TRADEMARK OFFICE
CERTIFICATE OF CORRECTION

PATENT NO. : 7,076,378 B1
APPLICATION NO. : 10/293799
DATED : July 11, 2006
INVENTOR(S) : Huebner It is certified that error appears in the above-identified patent and that said Letters Patent is hereby corrected as shown below:

On page 4, in field (56), under "Other Publications", in column 2, line 45, insert -- pp. -- before "1-39.".

On page 4, in field (56), under "Other Publications", in column 2, line 46, delete "Initital" and insert -- initial --, therefor.

On page 4, in field (56), under "Other Publications", in column 2, line 47, delete ",HomePlug" and insert -- , HomePlug --, therefor.

On page 4, in field (56), under "Other Publications", in column 2, line 48, insert -- pp. -- before "1-109.".

On page 4, in field (56), under "Other Publications", in column 2, line 49, delete "Initital" and insert -- initial --, therefor.

On page 4, in field (56), under "Other Publications", in column 2, line 50, insert -- pp. -- before "1-109.".

On page 4, in field (56), under "Other Publications", in column 2, line 52, delete "specification,," and insert -- specification, --, therefor.

On page 4, in field (56), under "Other Publications", in column 2, line 52, insert -- pp. -- before "1-33.".

On page 4, in field (56), under "Other Publications", in column 2, line 55, delete ",297-304" and insert --, pp. 297-304 --, therefor.

On page 4, in field (56), under "Other Publications", in column 2, line 57, delete ",35-40" and insert -- , pp. 35-40 --, therefor.

On page 4, in field (56), under "Other Publications", in column 2, line 60, insert -- pp. -- before "550-557.".

UNITED STATES PATENT AND TRADEMARK OFFICE
CERTIFICATE OF CORRECTION

PATENT NO. : 7,076,378 B1
APPLICATION NO. : 10/293799
DATED : July 11, 2006
INVENTOR(S) : Huebner It is certified that error appears in the above-identified patent and that said Letters Patent is hereby corrected as shown below:

In column 1, line 2, delete "CHARACTERISTICS" and insert -- CHARACTERIZATIONS --, therefor.

In column 17, line 23, in Claim 37, after "based" insert -- on --.

In column 18, line 6, in Claim 40, after "comprising" insert -- : --.

Signed and Sealed this

Twenty-sixth Day of September, 2006

JON W. DUDAS
*Director of the United States Patent and Trademark Office*